(12) United States Patent
Lee

(10) Patent No.: US 12,118,010 B2
(45) Date of Patent: Oct. 15, 2024

(54) QUERY-BASED DATABASE LINKAGE DISTRIBUTED DEEP LEARNING SYSTEM, AND METHOD THEREFOR

(71) Applicant: KOREA PLATFORM SERVICE TECHNOLOGY, Daejeon (KR)

(72) Inventor: Jun Hyeok Lee, Daejeon (KR)

(73) Assignee: KOREA PLATFORM SERVICE TECHNOLOGY, Daejeon (KR)

( * ) Notice: Subject to any disclaimer, the term of this patent is extended or adjusted under 35 U.S.C. 154(b) by 0 days.

(21) Appl. No.: 18/278,306

(22) PCT Filed: Nov. 4, 2021

(86) PCT No.: PCT/KR2021/015951
§ 371 (c)(1),
(2) Date: Aug. 22, 2023

(87) PCT Pub. No.: WO2023/080276
PCT Pub. Date: May 11, 2023

(65) Prior Publication Data
US 2024/0143611 A1    May 2, 2024

(30) Foreign Application Priority Data
Nov. 4, 2021    (KR) .................. 10-2021-0150814

(51) Int. Cl.
*G06F 16/00*    (2019.01)
*G06F 16/22*    (2019.01)
(Continued)

(52) U.S. Cl.
CPC ...... *G06F 16/2471* (2019.01); *G06F 16/2282* (2019.01); *G06F 16/258* (2019.01)

(58) Field of Classification Search
CPC ............... G06F 16/213; G06F 16/9024; G06F 21/6218; G06F 21/6227; G06F 16/24542;
(Continued)

(56) References Cited

U.S. PATENT DOCUMENTS

2018/0173571 A1* 6/2018 Huang .................. G06N 3/063
2019/0324964 A1 10/2019 Shiran et al.
(Continued)

FOREIGN PATENT DOCUMENTS

KR      10-0963885 B1    6/2010
KR      10-2058124 B1    12/2019

OTHER PUBLICATIONS

International Search Report for PCT/KR2021/015951 mailed Aug. 3, 2022 from Korean Intellectual Property Office.
(Continued)

*Primary Examiner* — Shyue Jiunn Hwa
(74) *Attorney, Agent, or Firm* — Paratus Law Group, PLLC

(57) ABSTRACT

A deep learning framework application database server includes: an input/output unit configured to receive an inference query from a user; a storage unit serving as a database and comprising a previously learned first learning model table and an inference dataset table associated with the inference query; and a framework unit configured to interwork with the database and perform deep learning for the inference query using the first learning model table and the inference dataset table.

8 Claims, 20 Drawing Sheets

(51) Int. Cl.
*G06F 16/2458* (2019.01)
*G06F 16/25* (2019.01)

(58) Field of Classification Search
CPC ............... G06F 16/242; G06F 16/2423; G06F 16/24534; G06F 16/24547; G06F 16/25; G06F 16/2433; G06F 16/2465; G06F 21/76; G06F 9/46; G06F 16/24544; G06F 16/24552; G06F 16/24553; G06F 16/248; G06N 5/04; G06N 3/08; G06N 5/022; H04N 21/47205; H04L 51/10; H04L 51/52

See application file for complete search history.

(56) References Cited

U.S. PATENT DOCUMENTS

| | | |
|---|---|---|
| 2020/0012892 A1 | 1/2020 | Goodsitt et al. |
| 2020/0167427 A1 | 5/2020 | Filoti et al. |
| 2021/0174238 A1* | 6/2021 | Song ................. G06F 16/24542 |
| 2021/0294600 A1 | 9/2021 | Kalia et al. |
| 2023/0109398 A1* | 4/2023 | Kranski ................. B25J 9/161 |
| | | 700/250 |

OTHER PUBLICATIONS

Korean Office Action for related KR Application No. 10-2021-0150814 mailed May 3, 2023 from Korean Intellectual Property Office.

Yuhao Zhang et al., "Distributed Deep Learning on Data Systems: A Comparative Analysis of Approaches", Proceedings of the VLDB Endowment, Jun. 1, 2021, pp. 1769-1782, vol. 14, No. 10.

Sebastian Ruder, "An Overview of Multi-Task Learning in Deep Neural Networks", Jun. 15, 2017, pp. 1-14, arXiv:1706.05098v1.

* cited by examiner (a)

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |
| 65 | 66 | 67 | 68 | 69 | 70 | 71 | 72 |
| 73 | 74 | 75 | 76 | 77 | 78 | 79 | 80 |

(b-1)

| b1 | 2 | 68 | 73 | 47 | 21 | 66 | 51 | 75 |
|---|---|---|---|---|---|---|---|---|
| b2 | 63 | 49 | 14 | 59 | 50 | 62 | 67 | 56 |
| b3 | 38 | 57 | 27 | 29 | 22 | 17 | 74 | 45 |
| b4 | 78 | 46 | 77 | 28 | 40 | 60 | 42 | 24 |
| b5 | 10 | 39 | 41 | 70 | 64 | 79 | 33 | 32 |
| b6 | 76 | 18 | 80 | 16 | 3 | 69 | 11 | 20 |
| b7 | 53 | 35 | 13 | 71 | 37 | 7 | 31 | 44 |
| b8 | 25 | 55 | 36 | 54 | 8 | 30 | 58 | 65 |
| b9 | 68 | 73 | 47 | 21 | 66 | 51 | 75 | 9 |
| b10 | 49 | 14 | 59 | 50 | 62 | 67 | 56 | 1 |

(b-2)

| b1 | 28 | 31 | 68 | 32 | 22 | 14 | 24 | 43 |
|---|---|---|---|---|---|---|---|---|
| b2 | 1 | 6 | 15 | 45 | 69 | 80 | 71 | 66 |
| b3 | 52 | 56 | 39 | 17 | 30 | 79 | 36 | 40 |
| b4 | 42 | 18 | 59 | 49 | 77 | 44 | 12 | 64 |
| b5 | 20 | 55 | 46 | 8 | 2 | 67 | 4 | 16 |
| b6 | 9 | 41 | 72 | 75 | 34 | 23 | 37 | 65 |
| b7 | 74 | 50 | 10 | 73 | 35 | 62 | 60 | 61 |
| b8 | 70 | 3 | 63 | 57 | 21 | 25 | 33 | 47 |
| b9 | 31 | 68 | 32 | 22 | 14 | 24 | 43 | 38 |
| b10 | 6 | 15 | 45 | 69 | 80 | 71 | 66 | 13 |

(b-2)

| b1 | 70 | 52 | 64 | 15 | 61 | 59 | 2 | 74 |
|---|---|---|---|---|---|---|---|---|
| b2 | 5 | 42 | 11 | 62 | 18 | 40 | 36 | 41 |
| b3 | 54 | 44 | 31 | 17 | 32 | 4 | 51 | 20 |
| b4 | 76 | 77 | 50 | 34 | 80 | 45 | 13 | 26 |
| b5 | 57 | 25 | 60 | 33 | 1 | 28 | 63 | 47 |
| b6 | 19 | 3 | 73 | 14 | 71 | 75 | 8 | 22 |
| b7 | 9 | 30 | 46 | 35 | 79 | 68 | 24 | 7 |
| b8 | 6 | 69 | 21 | 10 | 29 | 56 | 55 | 49 |
| b9 | 52 | 64 | 15 | 61 | 59 | 2 | 74 | 37 |
| b10 | 42 | 11 | 62 | 18 | 40 | 36 | 41 | 65 |

FIG. 23

| L # | | ROW # | C1 | C2 | C3 | C4 | C5 | C6 | C7 | | Task # |
|---|---|---|---|---|---|---|---|---|---|---|---|
| | | <$T_{NW}$> | | | | | | | | | |
| L_1 | ↔ | H_1 | ... | ... | ... | ... | ... | ... | ... | ↔ | T_1 |
| L_2 | ↔ | H_2 | ... | ... | ... | ... | ... | ... | | ↔ | T_2 |
| L_3 | ↔ | H_3 | ... | ... | ... | ... | ... | ... | | ↔ | T_3 |
| L_4 | ↔ | H_4 | ... | ... | ... | ... | ... | ... | | ↔ | T_4 |
| L_5 | ↔ | H_5 | ... | ... | ... | ... | ... | | | ↔ | T_5 |
| L_6 | ↔ | H_6 | ... | ... | ... | ... | ... | | | ↔ | T_6 |
| L_7 | ↔ | H_7 | ... | ... | ... | ... | | | | ↔ | T_7 |
| L_8 | ↔ | H_8 | ... | ... | ... | ... | | | | ↔ | T_8 |
| L_9 | ↔ | H_9 | ... | ... | ... | ... | | | | ↔ | T_9 |
| ... | ↔ | ... | ... | ... | ... | ... | | | | ↔ | ... |
| L_N-1 | ↔ | H_N-1 | ... | ... | ... | ... | | | | ↔ | T_N-1 |
| L_N | ↔ | H_N | ... | ... | ... | | | | | ↔ | T_N |

QUERY-BASED DATABASE LINKAGE DISTRIBUTED DEEP LEARNING SYSTEM, AND METHOD THEREFOR

CROSS-REFERENCE TO PRIOR APPLICATIONS

This Application is a National Stage Patent Application of PCT International Application No. PCT/KR2021/015951 (filed on Nov. 4, 2021), which claims priority to Korean Patent Application No. 10-2021-0150814 (filed on Nov. 4, 2021), which are all hereby incorporated by reference in their entirety.

BACKGROUND

The present invention relates to a query-based deep learning framework application database server, and a query-based database linkage distributed deep learning system and method, and to a server and a system for performing distributed processing of some of tasks according to deep learning inference, and a method therefor.

To create a learning engine that provides intelligence based on deep learning technology, there are several difficulties such as deep network design, setting up learning functions, parameter tuning, and more. These issues are not easily overcome by those who are not deep learning experts, making it difficult for anyone to easily build a deep learning-based learning engine.

Furthermore, each time a learning engine is created, there arises a problem of redundant utilization of common elements of deep learning, requiring the repetition of the same process.

Additionally, when using a single server or device for deep learning training, the training and inference times are greatly prolonged depending on the amount of data.

PRIOR ART LITERATURE (Patent Literature 1) KR10-2058124 B1

SUMMARY

An object of the present invention is to provide a query-based database linkage distributed deep learning system, and a method therefor, enabling a user without specialized knowledge in deep learning to infer data corresponding to a query by easily training data stored in an information database in response to a user's requested query through a deep learning approach, also enabling utilization of a pre-learned model and requiring less deep learning training and inference time.

A deep learning framework application database server according to an embodiment of the present invention includes: an input/output unit configured to receive an inference query from a user; a storage unit serving as a database and comprising a previously learned first learning model table and an inference dataset table associated with the inference query; and a framework unit configured to interwork with the database and perform deep learning for the inference query using the first learning model table and the inference dataset table, wherein a first learning model linked to the first learning model table comprises multiple tasks, the multiple tasks correspond to a plurality of rows in a network table included in the first learning model table, each of the multiple tasks has a unique number respectively corresponding to row numbers in the network table, the deep learning framework application database server further comprises a control unit configured to control a first distributed server among the plurality of distributed servers to execute a sequence of first to second tasks among the multiple tasks, enabling distributed deep learning inference, each of the plurality of distributed servers comprises a deep learning framework that interworks with the database and comprises the first learning model table.

In addition, the control unit may transmit a unique number of the first learning model table, a third result value list of a third task immediately preceding the first task, and a second row number in the network table that corresponds to a unique number of the second task to the first distributed server.

Also, when receiving a unique number of the learning model table and a fourth result value list of a fourth task among the multiple tasks from a second distributed server among the plurality of distributed servers, the control unit may determine the fourth result value list as a result value list resulting from execution of a sequence of initial to fourth tasks among the multiple tasks.

In addition, a fifth row number may be positioned immediately after the fourth row number in a plurality of network tables.

When further receiving a sixth row number that is a task instruction completion row from the second distributed server, the control unit may control the framework unit to perform operations for the fifth row number to the sixth row number by using the fourth result value list as an input.

In addition, the control unit may control the first distributed server to transmit a unique number of the network table, a result value list of the second task, and a seventh row number that is a task instruction completion row to a third distributed server among the plurality of distributed servers.

Also, execution time for the first to second tasks on the framework unit may be greater than the sum of communication time with the first distributed server and execution time for the first to second tasks on the first distributed server.

The deep learning framework application database server may further include a query analysis unit configured to analyze the query to extract a query of the query, the query analysis unit may further extract a preprocessing detection function for detecting whether deep learning inference on inference data for the function of the query which is a primary function is needed, the storage unit may include a plurality of learning model tables associated with the function of the query and the preprocessing detection function, and the control unit may allow deep learning inference for the preprocessing detection function to be performed on first inference data of the inference dataset table, and control the first to second tasks for the first inference data to be executed on the first distributed server when the first inference data is classified as requiring the deep learning inference for the main function.

In addition, the learning model management module may select a second learning model table suitable for the inference query function in the absence of the first learning model table, the second learning model table may be converted into the first learning model table through deep learning training for a first detailed function based on an associated training dataset table, and the deep learning training may be performed on the plurality of distributed server in a distributed manner.

Further, the control unit may spread a batch size of a training dataset, the second learning model table, and the training dataset table to the plurality of distributed servers, the deep learning framework application database server may function as a first distributed server among the plurality of distributed servers, the control unit may randomly change a data order in the training dataset table, then divide data to the batch size, and convert it into a batch dataset table, the framework unit may construct a model architecture using an architecture table belonging to the second learning model table, initialize a learning parameter table belonging to the second learning model table and then assign the initialized learning parameter table to the model architecture to generate a second learning model, and perform deep learning training on the second learning model by using multiple mini-batches in the batch dataset table, the framework unit may derive a new learning parameter when batch learning on one mini-batch among the multiple mini-batches ends, the control unit may spread the new learning parameter to the remaining other distributed servers of the plurality of distributed servers and comprises an integration unit configured to integrate the new learning parameter, when generated, and at least one learning parameter spread from the remaining other distributed server, updating the integrated parameter as a learning parameter to be applied to next batch learning, the integration unit may derive a final learning parameter by integrating a last learning parameter derived by the framework unit and at least one latest learning parameter spread from the remaining other distributed servers when all assigned epochs are finished, and the control unit may convert a trained model architecture and the final learning parameter into the learned first learning model table.

A distributed method according to an embodiment of the present invention, which is a distributed inference method of a deep learning framework application database server that includes: a storage unit serving as a database and comprising a first learning model table previously learned through a deep learning training query, as well as an inference dataset table; and a framework unit configured to interwork with the database and perform deep learning for an inference query using the first learning model table and the inference dataset table, the method including: receiving a deep learning inference query from a user wherein a first learning model linked to the first learning model table comprises multiple tasks; selecting the first learning model table; determining whether distributed inference is necessary; transmitting, when the distributed inference is necessary, the first learning model table to a first distributed server among a plurality of distributed servers, each comprising a deep learning framework interworking with the database; determining a range of tasks for distributed inference; and allowing the range of tasks for distributed inference which is a sequence of first to second tasks among the multiple tasks to be executed on the first distributed server.

In addition, the multiple tasks may correspond to a plurality of rows in a network table included in the first learning model table, a first task among the multiple tasks may have a unique number corresponding to a row number in the network table, and the method may further include transmitting a unique number of the first learning model table, a third result value list of a third task immediately preceding the first task, and a second row number in the network table that corresponds to a unique number of the second task to the first distributed server.

The method may further include: receiving a unique number of the first learning model table and a fourth result value list of a fourth task among the multiple tasks, from a second distributed server among the plurality of distributed servers and determining the fourth result value list as a result value list resulting from execution of a sequence of initial to fourth tasks among the multiple tasks task.

In addition, a sixth row number may be positioned immediately after the fourth row number in a plurality of network tables, and the method may further include further receiving a fifth row number that is a task instruction completion row from the second distributed server; and performing operations for the sixth row number to the fifth row number by using the fourth result value list as an input.

Moreover, the method may further include controlling the first distributed server to transmit a unique number of the network table, a result value list of the second task, and a seventh row number that is a task instruction completion row to a third distributed server among the plurality of distributed servers.

A distributed system according to an embodiment of the present invention, which is a query-based database linkage distributed deep learning system that includes a plurality of distributed servers, each comprising a deep learning framework application query-based deep learning database server, and a main server configured to manage the plurality of distributed servers, wherein the main server may include: an input/output unit configured to receive an inference query input from a user; and a storage unit serving as a database and comprising a previously learned first learning model table and an inference dataset table associated with the inference query, a first learning model linked to the first learning model table comprises multiple tasks, the multiple tasks correspond to a plurality of rows in a network table included in the first learning model table, each of the multiple tasks has a unique number respectively corresponding to row numbers in the network table, and the main server is configured to control a first distributed server among the plurality of distributed servers to execute a sequence of first to second tasks among the multiple tasks, enabling distributed deep learning inference.

According to the present invention, by using query-based deep learning technology, a deep learning framework may be connected to a database in the form of a plug-in, which enables deep learning training and inference using data stored in the database according to a query requested by a user, and thus allows a user without specialized knowledge to utilize deep learning training and inference.

BRIEF DESCRIPTION OF THE DRAWINGS

FIG. 12 illustrates a dataset of a main server and datasets for training of distributed servers.

FIG. 23 illustrates a portion of a network table.

DETAILED DESCRIPTION

Figure 1:
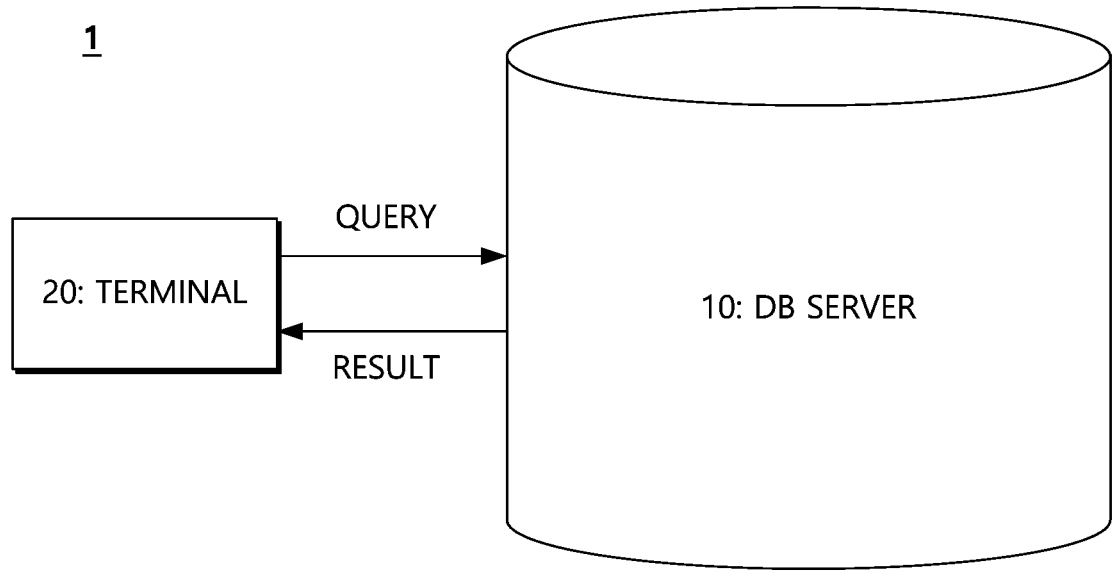
FIG. 1 is a block diagram schematically illustrating the overall configuration of a query-based deep learning inference system according to an embodiment of the present invention.

Hereinafter, embodiments of the present disclosure will be described in detail with reference to the drawings.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. In contrast, when a component is referred to as being "directly connected or coupled", no intervening components are present between the two components. In addition, it is understood that when a first element is connected to or accesses a second element in a network, the first element and the second element can transmit and receive data therebetween.

In the following description, usage of suffixes such as "module" or "unit" used for referring to elements is given merely to facilitate explanation of the present invention, without having any significant meaning by itself. Thus, the "module" and "unit" may be used together.

When the elements described herein are implemented in the actual applications, two or more elements may be combined into a single element, or one element may be subdivided into two or more elements, as needed. Throughout the drawings and the detailed description, unless otherwise described, the same drawing reference numerals are understood to refer to the same elements, features, and structures.

Moreover, the present invention covers all possible combinations of example embodiments indicated in this specification. It is to be understood that the various embodiments of the present invention, although different, are not necessarily mutually exclusive. A particular feature, structure, function, or characteristic described herein in connection with one embodiment may be implemented within other embodiments. For example, elements mentioned in first and second embodiments may perform all functions of the first and second embodiments.

Figure 2:
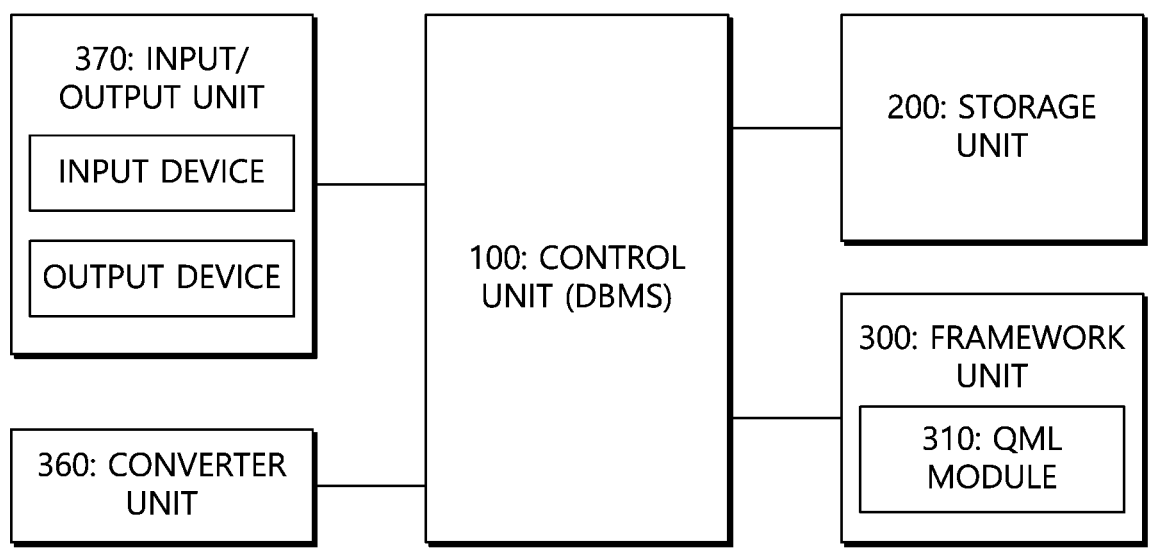
FIG. 2 is a control block diagram of a database server according to an embodiment of the present invention.
Figure 3:
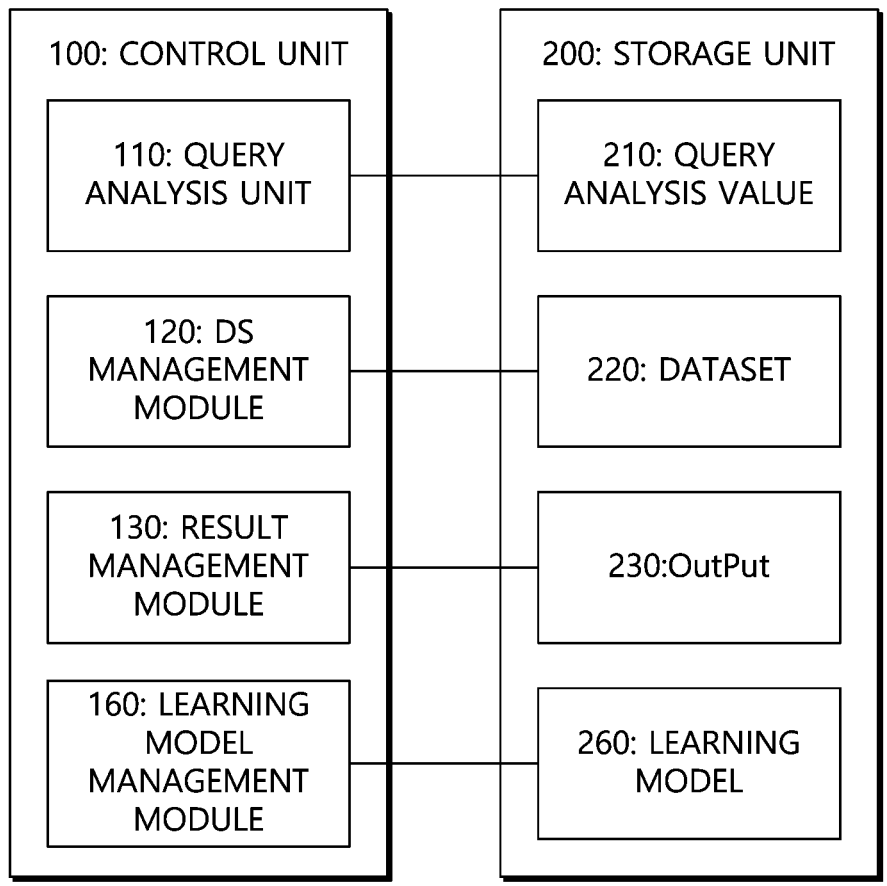
FIG. 3 is a data management block diagram according to an embodiment of the present invention.
Figure 4:
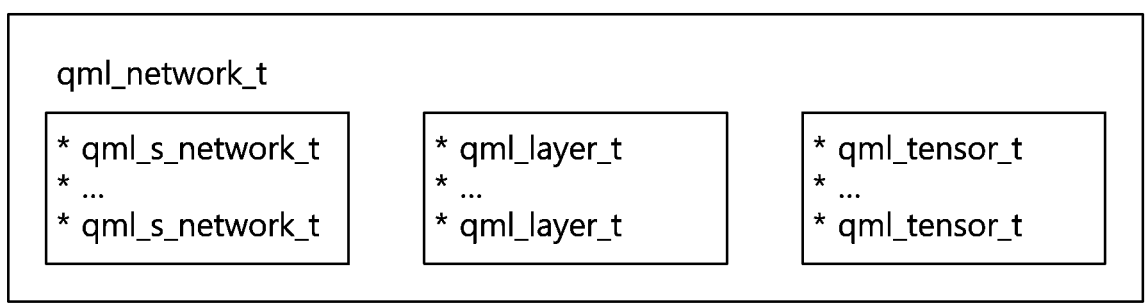
FIG. 4 is a database structure diagram according to an embodiment of the present invention.
Figure 5:
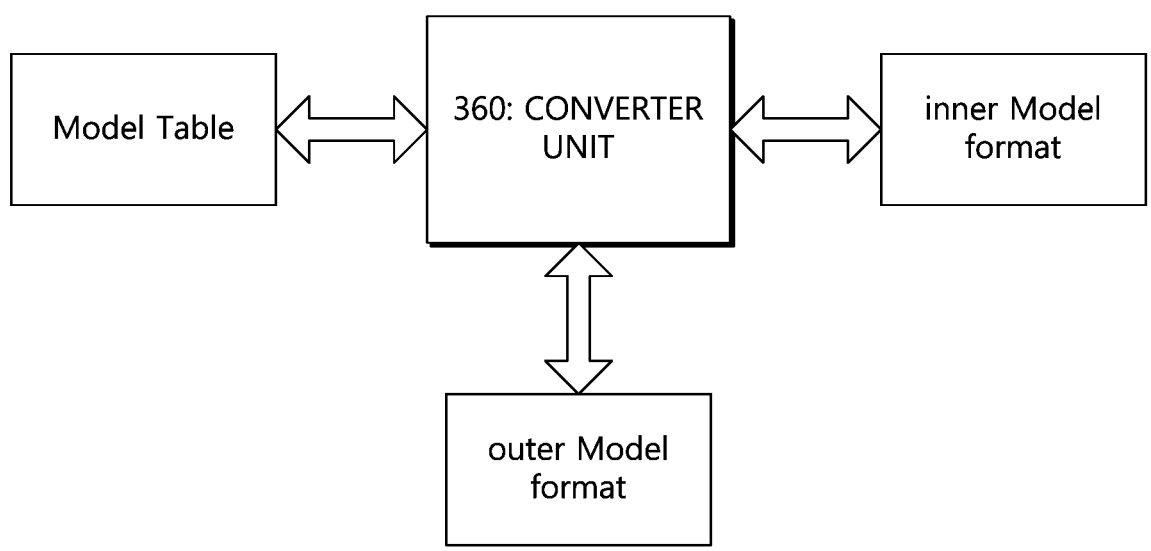
FIG. 5 is a control block diagram of a conversion unit according to an embodiment of the present invention.
Figure 6:
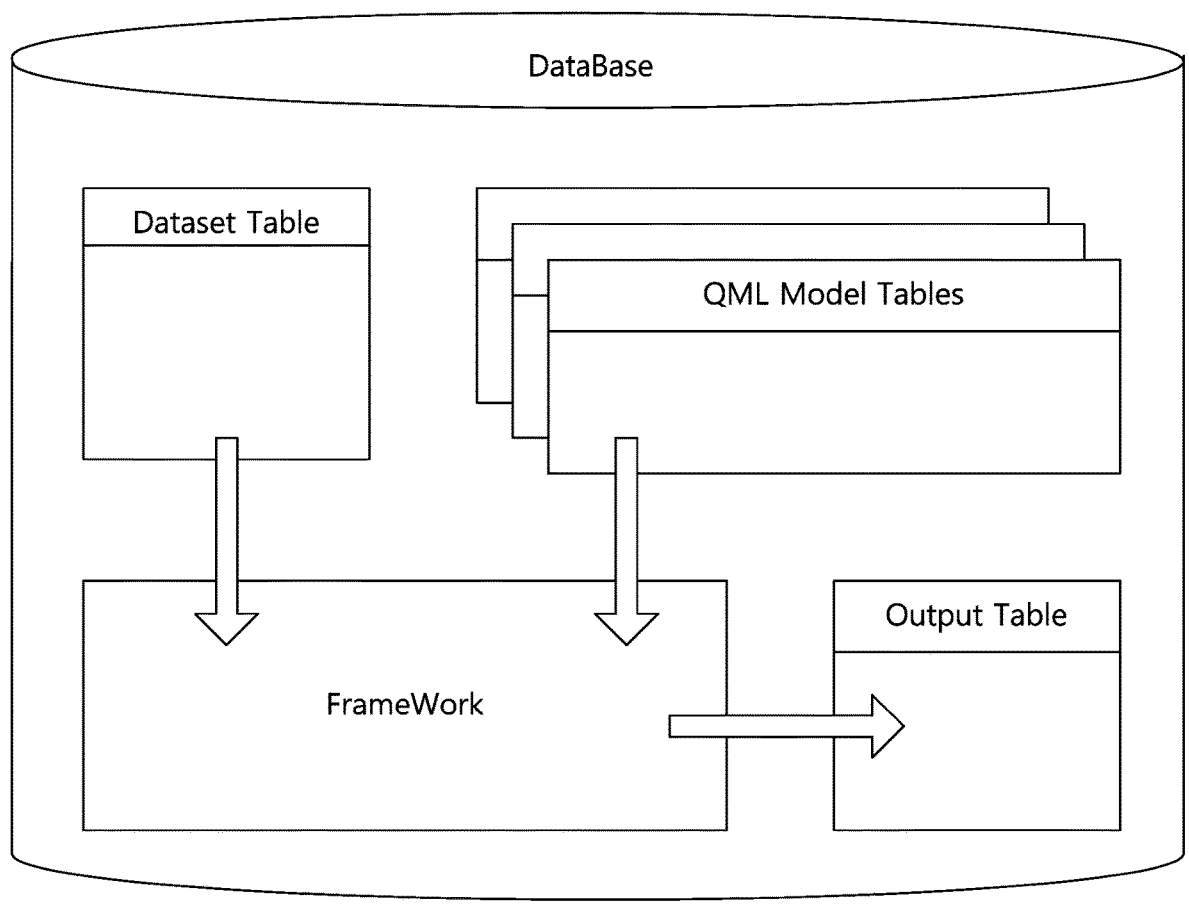
FIGS. 6 and 7 are block diagrams illustrating a conversion operation of a conversion unit according to an embodiment of the present invention.
Figure 7:
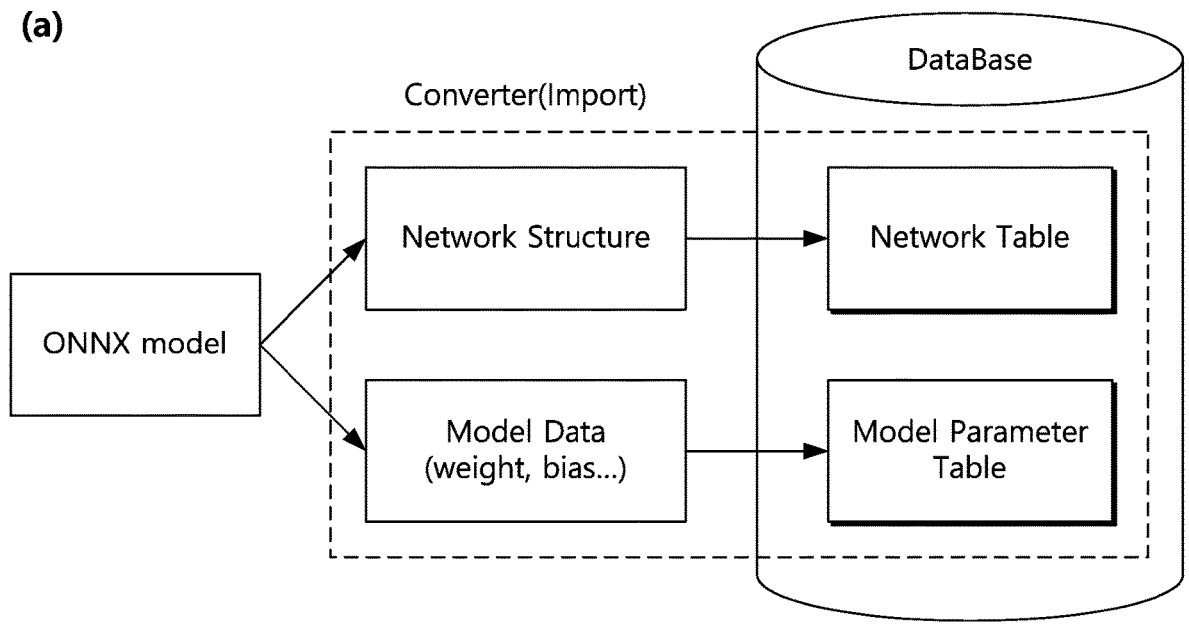
Figure 7:
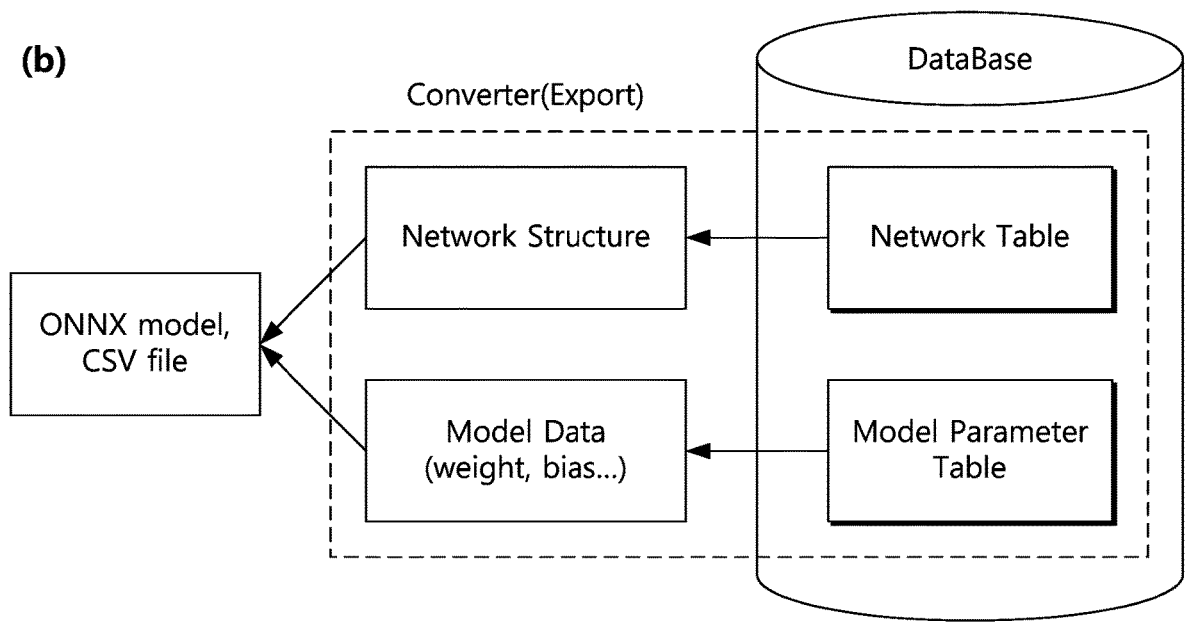
Figure 8:
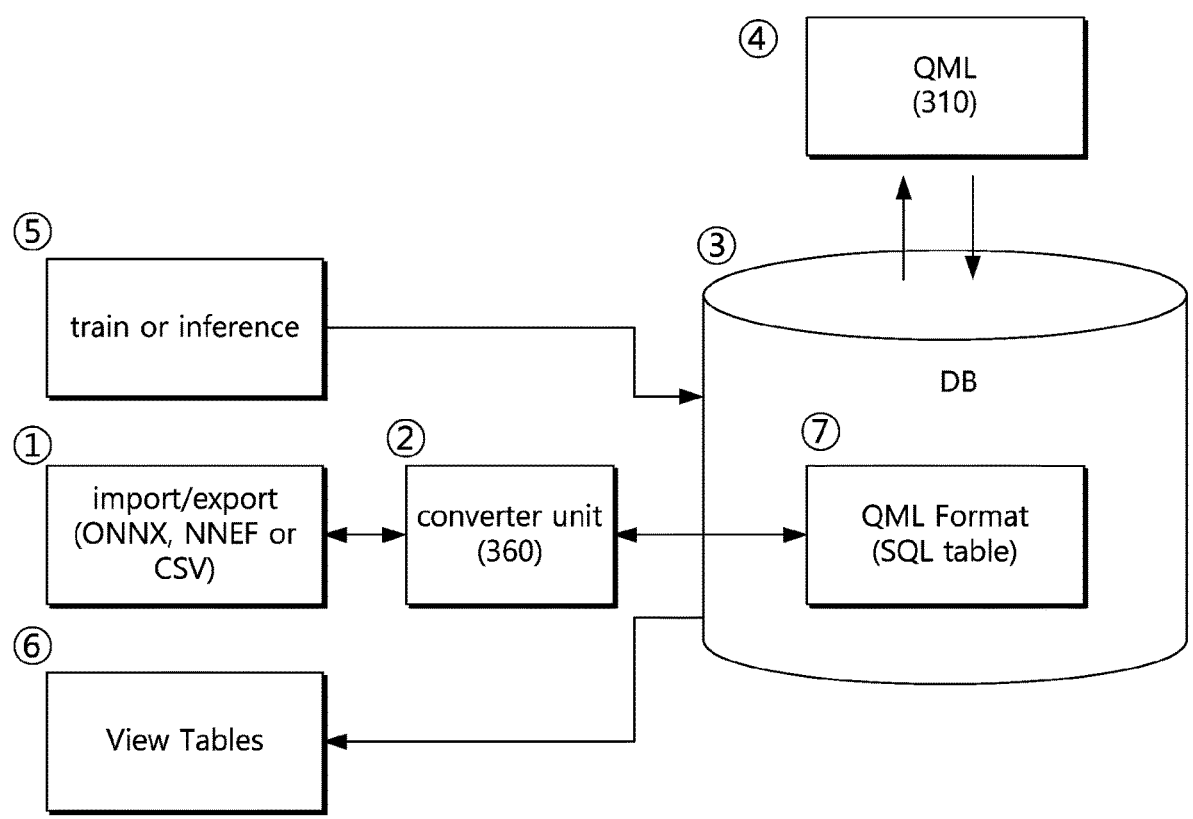
FIG. 8 is a diagram illustrating a process flow of a query-based machine learning technique according to an embodiment of the present invention.
Figure 9:
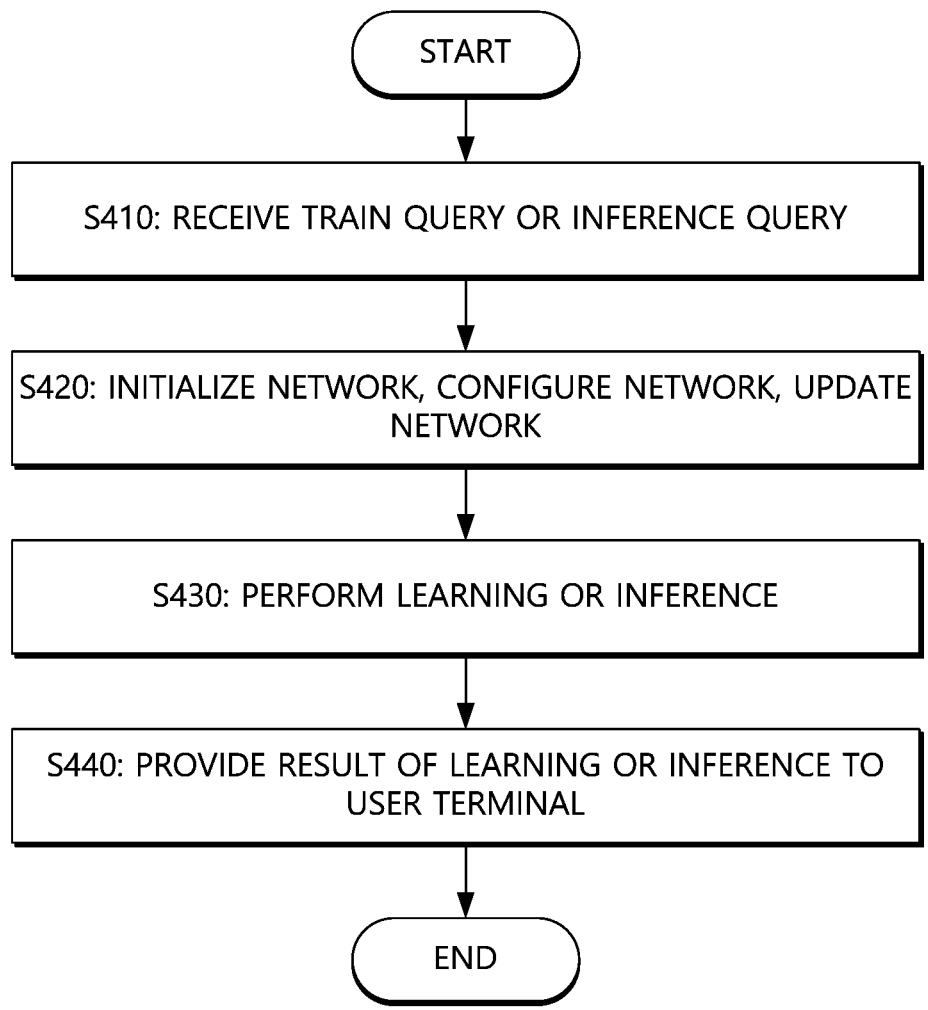
FIG. 9 is an operational flowchart for explaining a query-based deep learning inference method according to an embodiment of the present invention.

FIG. 1 is a block diagram schematically illustrating the overall configuration of a query-based deep learning inference system according to an embodiment of the present invention. FIG. 2 is a control block diagram of a database server according to an embodiment of the present invention. FIG. 3 is a data management block diagram according to an embodiment of the present invention. FIG. 4 is a database structure diagram according to an embodiment of the present invention. FIG. 5 is a control block diagram of a conversion unit according to an embodiment of the present invention. FIGS. 6 and 7 are block diagrams illustrating a conversion operation of a conversion unit according to an embodiment of the present invention. FIG. 8 is a diagram illustrating a process flow of a query-based machine learning technique according to an embodiment of the present invention. FIG. 9 is an operational flowchart for explaining a query-based deep learning inference method according to an embodiment of the present invention.

Referring to FIG. 1, a query-based deep learning inference system 1 according to an embodiment of the present invention may employ query-based machine learning technology. To this end, the query-based deep learning inference system 1 may include a database (DB) server 10 and a terminal 20.

Here, query-based deep learning technology refers to a technique where a user sends queries to request operations such as deep learning to a DB server 10 through a terminal 20 and upon receiving these queries, the DB server 10 utilizes data stored within it, and through a deep learning framework connected to the DB server 10, performs operations such as machine learning, deep learning, and inference.

Deep learning may be a set of machine learning algorithms that attempt high-level abstraction through a combination of various nonlinear transformation techniques. Machine learning, as one field of artificial intelligence, refers to a field involving development of algorithms and technologies that enable computers to learn. Artificial intelligence entails computer systems equipped with functions resembling human intelligence and may refer to the artificial implementation of human intelligence in machines. In this specification, "deep learning" is not limited solely to the technology of deep learning itself, and it may encompass machine learning and even artificial intelligence.

The terminal 20 may be any one or a combination of devices such as a smartphone, a portable terminal, a mobile terminal, a personal computer, a personal digital assistant (PDA), a portable multimedia player (PMP) terminal, a telematics terminal, a navigation terminal, a personal computer, a laptop, a slate PC, a tablet PC, an ultrabook, a wearable device (e.g., smartwatch, smart glasses, a head mounted display (HMD), etc.) a Wibro terminal, an Internet protocol television (IPTV) terminal, a smart TV, a digital broadcasting terminal, an audio video navigation (AVN) terminal, an audio/video (A/V) system, and a flexible terminal. The terminal 20 may further include a server computer.

The terminal 20 may access the DB server 10. A user or administrator may send a query to the DB server 10 through the terminal 20 or receive a result according to the query.

The DB server 10 may operate a database or be connected to a database, serving as a server that controls the database. The DB server 10 may represent a concept that encompasses a set of integrated and managed data (database), along with middleware that manages it. The DB server 10 may refer to a database management system (DBMS). The term "database" may also be used to refer to the DB server 10 or the DBMS.

The DB server 10 may refer to any device that performs tasks based on queries or generate results according to queries. Queries may conform to the structured query language (SQL) syntax. A database of the DB server 10 is preferably a relational database.

The terminal 20 may input a deep learning inference query and receive a corresponding inference result from the DB server 10.

Through queries, the terminal 20 may request a variety of functionality from the DB server 10 and receive results from the DB server 10 as responses. The terminal 20 may use queries to inspect or modify data stored in the DB server 10, as well as add new data. Using queries, the terminal 20 may inspect or modify a learning model stored in the DB server 10 and create a new learning model for further learning. Through queries, the terminal 20 may select data and learning model, set parameters, and request machine learning, and also examine intermediate and final results. The terminal 20 may select data and previously learned learning model through queries to request machine inference and check the inference results.

Referring to FIG. 2, the DB server 10 may include a control unit 100, a storage unit 200, a framework unit 300, a converter unit 360, and an input/output unit 370.

The input/output unit 370 may be an independent interface device. The input/output unit 370 may be equipped with separate input and output devices.

The output device may generate video signals and/or audio signals. The output device may include a display device, such as a monitor, and/or an audio device, such as a speaker.

The input device may generate input data input by a user for controlling the operation of the DB server 10. The input device may be equipped with a user operable device such as a keyboard, a keypad, a touchpad, a mouse, etc.

The input and output devices may be integrated into a single device, such as a touchscreen.

The input device may input an audio signal and/or a video signal to the DB server 10. The input device may be provided with a camera, a microphone, and the like.

The input device may include a sensor device. The sensor device may include a temperature sensor, a humidity sensor, a brightness sensor, a dust sensor, a pressure sensor, a vibration sensor, a voltage sensor, a current sensor, a parallel sensor, a magnetic sensor, an illuminance sensor, a proximity sensor, a distance sensor, an inclination sensor, a gas sensor, a heat detection sensor, a flame detection sensor, a metal detection sensor, a Hall sensor, and the like. The sensor device may generate data regarding temperature, humidity, brightness, dust (carbon), pressure, vibration, voltage, current, parallelism, magnetism, illuminance, proximity, distance, inclination, gas, heat detection, flame detection, metal detection, and the amount of rotation.

The input/output unit 370 may serve as an interface with all external devices connected to the DB server 10. Examples of the interface may include a wireless/wired data port, a socket of a card such as a memory card, an audio input/output (I/O) terminal, a video input/output (I/O) terminal, and the like. The input/output unit 370 may allow for receiving data from an external device or transmitting data from within the DB server 10 to the external device.

The input/output unit 370 may perform a communication function. Communication may use at least one short-range communication protocol such as Bluetooth, radio frequency identification (RFID), ultra wideband (UWB), Zigbee, etc. The communication may include Internet connectivity. The input/output unit 370 may exchange data with an external device, for instance, the terminal 20, through communication.

Although the terminal 20 is shown as a separate device in this specification, the input/output unit 370 may perform the functionality of the terminal 20. That is, the present invention may be implemented by replacing (omitting) the terminal 20 with the input/output unit 370.

The input/output unit 370 may handle communication with the user's communication means (terminal 2) and control communication protocols and network data formats with communication equipment and computing equipment, which are various forms of user connection means.

Examples of the data format include Open Neural Network Exchange Format (ONNX), Neural Network Exchange Format (NNEF), comma-separated values (CSV), or the like.

The input/output unit 370 may be a channel that receives a control command or query from the user and provides a result to the user.

The storage unit 200 may store data and programs necessary for the operation of the DB server 10. The storage unit 200 may store programs for processing and controlling the control unit 100 and perform functionality for temporary storage of input or output data.

The storage unit 200 may refer to a device that stores data in a database or to the database itself.

The storage unit 200 may store information about ongoing tasks, the history of performed tasks, as well as the user. The storage unit 200 may store information and/or data through connection with a separate external storage device or a storage device on an external network. The storage unit 200 may distribute and store deep learning results with characteristics of big data, or separately store them externally, and apply them upon request.

The control unit 100 may execute overall control of the DB server 10 by controlling the operation of each component of the DB server 10.

The control unit 100 may access data within the database, manage data, and create data in a table. Data management may refer to querying, modifying, and/or uploading data.

The control unit 100 may control all functions for interpreting and executing a user's query, performing a task according to the query, or providing a result accordingly.

Referring to FIGS. 3 and 4, the control unit 100 may include a query analysis unit 110, a dataset management module 120, a learning model management module 130, and a result management module 160, and the storage unit 200 may store a query analysis value 210, a dataset 220, a learning model 230, and a learning result 260.

The query analysis unit 110 may interpret and/or analyze a query requested by the user and store the interpreted and/or analyzed query as the query analysis value 210. The query analysis value 210 may include the function and/or content of the query. Queries may be broadly classified into training (learning) and inference. The query analysis value 210 may store a value that distinguishes whether the query is for training or inference.

The function of a query may be a request to derive a desired result value through the execution of deep learning operations. For example, a query requesting character recognition may involve the function of detecting text from image data and classifying the content of the text.

The function of a query is not limited to the user's request. For example, although a user's request may be singular, multiple detailed functions may be necessary to fulfill the query. The query analysis unit 110 may extract multiple detailed functions required to execute deep learning by analyzing the query.

The multiple detailed functions may be divided into a higher-level category and a subcategory. For example, in the case of a query requesting the distinction of a person's gender, the detailed functions may be extracted into a higher-level category of detecting facial features from image data and a subcategory of classifying the gender of the detected face. In this case, the detailed function of the higher-level category may be performed first, followed by the execution of the detailed function of the subcategory.

The content of a query may encompass various supplementary elements in addition to the functions. For example, it may involve selecting a specific learning model or specifying a dataset for training or inference.

The dataset 220 managed by the dataset management module 120 represent a set of information or data in the same format that will be used for learning and inference. The information or data may include numbers, text, images, videos, and audio, and it may be all types of information or data used for machine learning.

Data in the same format that can be collected as the dataset 220 may be defined based on file extensions. For example, in the case of image information, data with file extensions representing images may be grouped into datasets of the same category.

Here, image information is used as an example for illustration purposes, but the data used may be all types of data that can be used for machine learning, such as numbers, text, images, videos, and audio, as described above.

The dataset management module 120 may group information or data (referred to as 'data') input from external sources into a dataset of the same format based on their format (e.g., file extensions) or classify them based on their content. In the case of content-based classification, the dataset management module 120 may use a data classification learning model that categorizes data into the same format. The data classification learning model may be stored in the DB server 10 and invoked when needed.

The dataset management module 120 may preprocess data such that the dataset 220 is well applied to the learning model 230. Data preprocessing involves transforming data into a suitable form for the tensor (vector) of the learning model. An example of data preprocessing may include converting words into index numbers corresponding to a dictionary used in deep learning.

The dataset management module 120 may convert data from a first format to a second format. The dataset management module 120 may manage data of the second format as one collection (group) of datasets. For example, the dataset management module 120 may extract images frame by frame from video data and decode them into a collection of datasets. The dataset management module 120 may encode a series of images into a video. The series of images may be processed images. In other words, the dataset management module 120 may convert video data into a collection of image datasets and convert a collection of processed (mosaic) image datasets into a video.

The dataset management module 120 may provide a video streaming service. For example, the dataset management module 120 may encode a series of images for the video streaming service or provide a streaming service from a stored video file.

When creating a new dataset, the dataset management module 120 may generate a new table (dataset table), and query or modify data in the dataset table, or add new data.

The dataset management module 120 may access a table in the database to query data. The dataset management module 120 may display to the user the result of querying data of the database through a query written by the user. The dataset management module 120 may restrict the level of data modification based on the permission granted to the user. The dataset management module 120 may perform data upload by receiving numerical data input from the user or reading one or more files. The dataset management module 120 may provide a tagging function for creating labels for learning data.

In this specification, the terms "dataset table" and "dataset" may be used interchangeably. Especially in a relational database, a dataset refers to a set of data stored in a dataset table in the relational data format. The relational data format refers to a model that defines and describes data using a tabular structure. This may be equally applied to a learning model, a learning model table, a learning result, and a learning result table, which will be described below. However, their actual substances and/or formats may vary.

The learning model (LM) management module 130 may manage the learning model table 230 used in machine learning (such as deep learning).

In this embodiment, the learning model table 130 may include an architecture table and a learning parameter table. The architecture table may include the network table and the hyperparameter table.

The learning model table 230 may correspond to the learning model used in the framework unit 300.

In this embodiment, the learning model (learning network model) 230 may be a learnable classification model based on artificial intelligence algorithms and grounded in the dataset. The classification model may be a model based on a neural network. This classification model may be designed to simulate the structure of the human brain on a computer.

The classification model may include a plurality of network nodes with weights that simulate neurons of a human neural network. A connection relationship may be formed between the plurality of network nodes to simulate synaptic activity in which the neurons receive and transmit signals through synapses. This classification model may include a machine learning model, a neural network model, and/or a deep learning model.

The learning network model may implement at least one model among an artificial neural network (ANN) model, a deep neural network (DNN) model, a convolutional neural network (CNN) model, or a recurrent neural network (RNN) model. The mentioned models are not limited to these examples. For example, models such as a long short-term memory (LSTM) model, a gated recurrent units (GRU) model, a generative adversarial networks (GAN) model, and a super-resolution GAN (SRGAN) model may also be considered, and are not limited to these names.

In general, the learning model 230 may include architecture and parameters.

The architecture (model architecture) signifies the structure of a machine learning model. The architecture may include the number of layers corresponding to the structure of the learning model, the number of units, types of layers, and how units are connected. This may be represented as the architecture structure.

The architecture may correspond to an architecture table in the learning model table. The structure of the architecture may be referred to as a network model or network. The architecture structure may correspond to a network table in the learning model table. The architecture may indicate the assignment of hyperparameters to the architecture structure. To construct the architecture, the network table and hyperparameter table may be necessary.

Parameters may include hyperparameters and learning parameters.

Hyperparameters define the input/output and the internal aspect of the model and may include learning rate, optimization method (learning method; optimizer), types of layers, input/output sizes, parameters required for calculations, and the like. Hyperparameters may allow the architecture to be implemented. Hyperparameters may function as components of the architecture. Hyperparameters may be set heuristically, i.e., directly by humans. Additionally, hyperparameter optimization may be implemented through a separate optimizer module.

Learning parameters may include weights and/or biases. A weight is a value used for interaction with input data, and there may be a model weight corresponding to the model architecture. A value of a learning parameter may be changed by an optimizer. Learning parameters may simply be referred to as "parameters."

The optimizer may modify learning parameters so that the learning model has an intended function. Learning (deep learning) or training may refer to changes in these learning parameters. The optimizer may be implemented by the framework unit 300 or a separate element.

The hyperparameters and learning parameters may correspond to the hyperparameter table and learning parameter table described above.

The learning model management module 130 may create a new network model by adding a supported layer and adjusting layer parameters (type of layer, input/output size, parameters required for calculation).

The learning model management module 130 may retrieve a list of previously created network models. The learning model management module 130 may create a new network model by adding a new layer to the existing network model. This may be achieved through adjustment to hyperparameters. These series of tasks may be initiated by user's queries.

The learning model management module 130 may provide a function of visualizing and displaying a network model. Through this, the user can easily examine the structure of a hidden layer.

In addition to the architecture and parameters, the learning model 230 may further include a loss function that defines a feedback signal used in learning, as well as a separate optimizer module that determines how the learning proceeds. The loss function and optimizer may be provided in the framework unit 300.

The learning model 230 may be stored in a database in the format of a learning model table, which is in a relational data format.

Examples of functions of the learning model may include recognizing text input by a user, recognizing speech or text embedded in image/audio/video, and analyzing user intent based on recognized speech or text.

The learning model management module 130 may select a learning model table suitable for a query from among a plurality of learning model tables. The learning model management module 130 may select a learning model table 230 based on either the content of the query or the model selection policy.

If a specific learning model specified by the user is present in the query's content, the learning model management module 130 may select the corresponding learning model table. For example, if the query requests inference with a learned learning model according to a train query, the learning model management module 130 preferably selects a corresponding learning model table.

A model selection policy may serve as guidance for selecting a learning model table based on the function of the query and/or the dataset tables associated with the query. For example, according to the model selection policy, the learning model management module 130 may select a learning model table with a function similar to the query's function from among a plurality of learning model tables. Additionally, according to the model selection policy, the learning model management module 130 may select a learning model table with a function similar to the query's function and with a data structure similar to a dataset table associated with the query.

Key techniques of the learning model may include binary classification, multi-class classification, regression analysis, numerical prediction, time series forecasting, sentiment analysis, clustering, anomaly detection, dimensionality reduction, reinforcement learning, and the like. According to the model selection policy, the learning model management module 130 may select a learning model table with a technique suitable for the query's function.

The learning model management module 130 may select a learning model table previously learned. In this case, the learning model management module 130 may validate and test whether the existing learning model operates correctly. If the learning model operates properly, the learning model management module 130 may calculate the existing learning model table as a result of deep learning training. If the validation and testing reveal that the existing learning model does not work properly or that there is difference in the format or number of input data, the selected learning model table may be trained through deep learning to calculate a new learning model table.

Referring to FIG. 4, the learning model table may include a network table (qml_network_t). The architecture may be transformed into the format of the network table (qml_network_t), which is a relational data format, and stored in the database. The network table (qml_network_t) may be converted into the architecture of the learning model 230. This may be carried out by the converter unit 360.

The network table may include a plurality of sub-network tables (qml_s_network_t). For example, in the case of learning a network model using multiple GPUs (N GPUs), N sub-network tables may be included. In the case of inferring a network model, a single sub-network table may be included.

The network table or sub-network table may include a plurality of layer tables (qml_layer_t) related to layers that constitute the network. Layers forming the architecture structure of the learning model 230 may be converted into layer tables (qml_layer_t) and stored. The layer tables (qml_layer_t) may be converted into layers of the learning model 230.

The layer table (qml_layer_t) may include a plurality of tensor tables (qml_tensor_t). The tensor table may be a 4-dimensional tensor in NCHW format. The tensor table may include dtype, qml_shape_t, data, name, etc. The tensor tables and tensors of the learning model 230 can be converted into each other.

The parameters of the learning model 230 may be stored in a parameter table. The parameter of the learning model 230 and the parameter table may be converted into each other. This may be carried out by the converter unit 360.

According to a pre-designed DB schema in the present invention, model architecture and model weights may be stored in the DB table. The pre-designed DB schema may allow easy classification of similar dataset tables and learning model tables. When a new dataset is input to the DB server 10, a similar learning model may be invoked among the stored learning models in the relational data format and applied to the new dataset.

For example, the similarity between the input dataset and the prestored learning model may be determined based on the similarity of the structural aspects, such as degree, and the content elements, such as attributes and domains, among components of a table. The components of a table may include attribute, domain, degree, tuple, cardinality, relation, key, candidate key, primary key, and the like. The learning model management module 130 may perform such similarity assessment.

In a case where a relational data format learning model needs to be generated as a dataset with a similar format to an initial relational data format learning model is input after the initial learning model is generated, used, and then stored in a database, a model that exhibits high similarity is searched from among existing relational data format models stored in the database and the found model is invoked to apply the similarity assessment. By doing so, it is possible to reduce the time required to generate a suitable learning model and to efficiently use computing resources.

The learning model table, with its components linked in a relational data format, may serve as a guide for users or administrators to ensure that no components are missing when performing tasks.

The framework unit 300 may utilize elements stored as tables of the database structure as they are, or manipulate them for suitability within the framework unit 300 before use. Such manipulation may be performed by the framework unit 300 or the converter module 360.

The result management module 160 may manage the learning results 260 such as outputs generated by each layer during machine learning, intermediate values, parameter values, evaluation metrics (learning loss values of deep learning functions) of the model for which calculations are being made, and inference results, such that the user can store the learning results 260 in the database or invoke them to check.

The storage unit 200 may further include a project table, a job table, and a common table, in addition to the dataset table 220, the learning model table 230, and the learning result table 260.

The job table may include user information, project status, logs, and the like. The common table may include lookup tables for layer types, error codes, and the like.

The project table may store actual learning model copied from the learning model table or information on a project intended for inference. The project table has a separate structure from the learning model table after the project is created, so modifications to the underlying network used in the project do not affect the already established learning model.

The storage unit 200 may store numerous and variable data (input/output data and weight information) as Binary Large Object (BLOB) or as text type. For a smaller quantity of variable data (such as each layer parameter, etc.), the storage unit 200 may split a record for storage.

The control unit 100 may ensure that all input/output data used in machine learning (training) and machine inference is stored, and the models used in machine learning and inference are stored. The control unit 100 may provide a procedure that corresponds to a user's query request, enabling machine learning to be performed according to the user request.

The procedures may include Insert Network, Insert Layer, Make Project, Input Data Loader, Init Network, Train, Save Model, and Test.

Insert Network may create a network table containing network (architecture) name, network type, dataset name, optimizer type, optimizer parameters, learning rate, batch size, number of learning times, and output layer index.

Insert Layer may register a layer table containing network ID, layer name, layer type, layer index, layer parameters, and input layer index.

Make Project may create a project that includes project name, dataset name, network name, learning or inference flag, and the number of GPUs.

Input Data Loader may input data based on user selections (layer index, query type-learning table, learning data, validation table, validation data).

Network Initialization may construct a network model.

Train may initiate learning that includes project ID, the number of learning epochs, batch size, continuation of learning, saving interval, validation interval, and GPU synchronization interval.

Save Model may copy network information of the project table to the network table (project name, network name).

Test may start inference that includes project ID and a flag indicating whether to store results from all layers.

The framework unit 300 may perform machine learning by using various machine learning frameworks or deep learning frameworks.

A framework may be a type of package that bundles together various libraries and modules for application program development for efficient use. Developers or administrators may quickly and easily utilize a wide range of pre-validated libraries and pre-learned deep learning algorithms through the framework.

Deep learning frameworks may include TensorFlow, Torch/PyTorch, Deeplearning4j, Microsoft Cognitive Toolkit (CNTK), Keras, Open Neural Network Exchange (ONNX), MXNet, Caffe, Quantum Machine Learning (QML), and the like.

The framework unit 300 may be a deep learning framework installed as a plug-in on the DB server 10. This may be expressed as a database linkage framework (deep learning framework) or a database application framework (deep learning framework).

The framework unit 300 may be executed through a call from the control unit 100 of the DB server 10. When invoked, the framework unit 300 may receive various data as arguments from the control unit 100 and return the execution results. The framework unit 300 may interpret a network model defined in a relational data format and construct a network within the framework. This interpretation may be executed by the converter unit 360.

The framework unit 300 may receive learning parameters and learning data as arguments from the control unit 100, perform learning of the network constructed within the framework, and return a learning result. The framework unit 300 may receive input data as arguments from the control unit 100, perform machine inference using the network constructed within the framework, and return a result.

Upon receiving a query, the framework unit 300 may confirm or modify the learning model stored in the DB server 10, and create a new learning model. According to the input query, the framework unit 300 may select information or data along with a learning model, set learning parameters, and perform machine learning. The framework unit 300 may provide intermediate and final results of the learning. Based on the input query, the framework unit 300 may select data and a pre-learned learning network model, execute machine inference, and provide the inference result.

In this embodiment, the framework unit 300 may include a QML module 310 as an internal framework. The internal framework may include other frameworks in addition to the QML module 310 or may include more frameworks. This may provide users with various options to use.

The QML module 310 may implement a QML plug-in function. The QML module 310 may be equipped with QML, which is a framework capable of performing deep learning. The QML module 310 may be connected to the database through a user-defined function (UDF) and may be executed by a call.

Functions defined in the framework may each be registered in the database through the UDFs, and the registered UDF invocation may trigger the execution of the framework.

The types of argument variables that can be used in the UDF are limited to integer, real number, and string. These variables may be used in QML. For example, the integer type may be used for integer values among essential parameters constituting a network model, as well as for an address value of structural memory defined within QML. The real number type may be used for real values among essential parameters constituting a network model, and the string type may be used for a varying number of parameters and binary blob data.

The QML framework may follow the NCHW (N: batch, C: channel, H: height, W: width) format, which is channel-first data format. It may support layer types used in ONNX, and the parameters defined for each layer may also follow the ONNX format.

The QML framework may incorporate the back-propagation algorithm to learn the network model. The QML framework may also incorporate gradient calculation algorithms and optimization algorithms to update model parameters (weight, bias).

The QML module 310 may support both a "train from scratch" technique and a fine tuning technique to learn a network model (architecture). In the train from scratch technique, a network model is learned from the beginning, and then an initialization algorithm determines the weights of each layer based on the learned model's weight. The fine tuning technique involves reading pre-trained model weights (stored in the database through an import function or obtained from previous learning attempts), setting initial weights for layers, and then continuing the learning process.

The QML module 310 may perform learning and inference using the information received from the database (DB server 10 and the control unit 100 or storage unit 200 of the server, and the same applies hereinafter). Information received from the database may be acquired by a combination of data received through user queries.

The converter unit 360 may convert a specific learning model into a different format. Specifically, the converter unit 360 may convert a specific learning model into a relational data format used in a database. The converter unit 360 may also convert a learning model in the relational data format into a specific learning model or another learning model. For example, the converter unit 360 may convert a learning model table stored as a table type in the database into the QML framework, which is an internal framework, or vice versa. The converter unit 360 may convert the architecture, layer, and parameters of the learning model 230 into relational data format tables, namely a network table, a layer table, and a parameter table, or vice versa.

Referring to FIG. 6, the converter unit 360 may convert a QML learning model table into a suitable learning model for the QML module 310. The converter unit 360 may convert a dataset table to a format suitable for use in the QML module 310 when needed. The QML module 310 (or framework unit 300) may perform learning and/or inference using the dataset and the converted QML learning model and output a learning result. The converter unit 360 may convert the learning result output by the QML module 310 into a relational data format and store it in an output table. This function may be performed by at least one of the QML module 310 and/or the dataset management module 120, either independently or collaboratively.

The converter unit 360 may be used for compatibility with an external framework. When a pre-learned model of an existing framework is imported or information or data is exported from the database to the outside, the converter unit 360 may convert the model, information, or data into another framework format such as the ONNX model format.

Referring to FIG. 7, the converter unit 360 may import the network structure and model data defined in the ONNX model format into the network model format of the database. Conversely, the converter unit 360 may export the network model from the database into a structured format including an ONNX model, or a CSV file.

The converter unit 360 may convert ONNX, NNEF, and hyperparameter and learning parameter files into structured formats other than the ONNX model format.

The user may convert the converted ONNX model and structured format into a desired target framework for use.

Through conversion operations using the converter unit 360, the user may apply the network model to another type of deep learning framework. This may allow the DB server 10 to invoke the model stored in the database in the relational data format and apply the model to a dataset of a similar form.

The converter unit 360 may minimize the time required for tasks through these conversion operations.

FIG. 8 is a diagram illustrating a process flow of a query-based machine learning technique according to an embodiment of the present invention.

Referring to FIG. 8, according to the query-based machine learning technique according to an embodiment of the present invention may involve converting a pre-learned model in ONNX format or a pre-learned model converted to ONNX format into QML format through a converter, receiving a training or inference query from a terminal 20, transmitting information from a database to a QML module 310, and performing training and inference in the QML module 310. Upon storing the training (learning) or inference result in the database, the terminal 20 may check the result stored in the database. Further details are explained below.

The terminal 20 may import a learning model or export a training model from the database (①).

When importing or exporting the learning model, the learning model may be converted to fit the database schema structure through a converter unit 360 (②).

The database may interpret the query and perform an appropriate task (③).

The control unit 100 may analyze the QML type of the query input from the terminal 20 and may transmit a corresponding result to the QML module 310. In more detail, the control unit 100 may analyze the language type of the input query and perform tasks, such as determining compatibility or checking for similar task histories in a storage unit 200.

The control unit 100 may select a program that achieves optimal performance for each operating system or machine learning framework (S/W) and may request the QML module 310 to perform training and inference. For example, if a dataset requiring training is an image, the control unit 100 may select machine learning S/W optimized for image training, and may request training from the selected S/W.

Additionally, the control unit 100 may check the resources of the server currently in use for training and, based on the resource capacity, apply a framework for training or selectively apply components when implementing the framework.

The QML module 310 may execute a plug-in in the database and perform training and inference based on information received from the database (④).

The terminal 20 may send a query to the database to request training or inference (⑤).

The terminal 20 may query the tables of the database to retrieve information related to learning (⑥).

Learning model data may be stored in the database as a QML schema (⑦).

FIG. 9 is an operational flowchart for explaining a query-based deep learning inference method according to an embodiment of the present invention.

Referring to FIG. 9, a query-based deep learning inference system according to an embodiment of the invention may perform a query-based deep learning method in the framework unit 300, which interworks with the terminal 2 and the DB server 10.

The control unit 100 may receive a train query (Call Train) or inference query (Call Inference) from the user terminal (S410).

The control unit 100 may analyze the query and transmit a suitable learning model along with a dataset to the framework unit 300.

The framework unit 300 may execute network initialization, network construction, and network update according to the learning query or the inference query (S420).

Once initialization for all layers is done, the framework unit 300 may execute training or inference (S430).

The framework unit 300 may obtain batch data until the end of learning, and iterate to store results and models.

The framework unit 300 may execute testing, acquire test data, perform feedforward, and store inference results.

The framework unit 300 may provide the training or inference results to the user terminal 130 upon the completion of training or inference (S440).

Meanwhile, the query-based deep learning inference system 1 according to an embodiment of the present invention may manage clients, members, datasets, networks, learning models, and learning execution as follows.

[Client Management]

The query-based deep learning inference system 1 according to an embodiment of the present invention may provide the user terminal 13—with functions for managing a dataset and a machine learning process and for checking a result.

[Member Management]

The query-based deep learning inference system 1 may grant permissions for accessing data in the database 110 and for creating and modifying a network model through member management, while also maintaining a record of change history.

[Dataset Management]

The query-based deep learning inference system 1 may create a new table for dataset management and offer functions for querying, modifying, and uploading data. When creating a new dataset, the system 1 may automatically generate a new table and upload data. The system 1 may access the table of the database to query data or display a result of querying data of the database through a query written by the user. The system 1 may modify data based on permissions. The system 1 may perform data upload by receiving numerical data input from the user or reading one or more files. The system 1 may provide a function of tagging a label for learning data.

[Network Management]

The query-based deep learning inference system 1 may provide functions for managing the network model as follows. The system 1 may add a supported layer and adjust layer parameters to create a new network model. The system 1 may retrieve a list of previous created network models. The system 1 may create a new network model by adding a new layer to the existing network model. Furthermore, the system 1 may provide a function of visualizing and displaying a network model.

[Learning Model Management]

The query-based deep learning inference system 1 may provide functions for managing learning as follows. The system 1 may adjust the network model, datasets, and training parameters to create or modify a training model. The system 1 may output the completely learned network model through a converter function. The system 1 may also check the resources of the server currently in use.

[Learning Execution Management]

The query-based deep learning inference system 1 may provide functions for performing training and inference and for checking results. The system 1 may check resources of the server. The system 1 may inform the user whether training and inference can be performed. The system 1 may retrieve a list of currently executed or pending learning plans. The system 1 may generate a training plan by setting a registered network model, datasets, and training parameters. The system 1 may check the learning parameters of the currently learning or pending learning plans. The system 1 may check the progress and results of the currently executed learning plan. The system 1 may stop the currently executed learning plan or start pending learning plan. The system 1 may generate an inference plan by setting a registered network model and dataset. The system 1 may check the results of executed inference plan.

As described above, according to the present invention, the query-based deep learning inference system may be realized by connecting a deep learning framework to an information database in the form of a plug-in, thereby allowing for learning data stored in the information database using a deep learning method in response to a query requested by the user and inferring data corresponding to the query so that even a user without specialized knowledge in deep learning can be provided with necessary information without difficulty.

Figure 10:
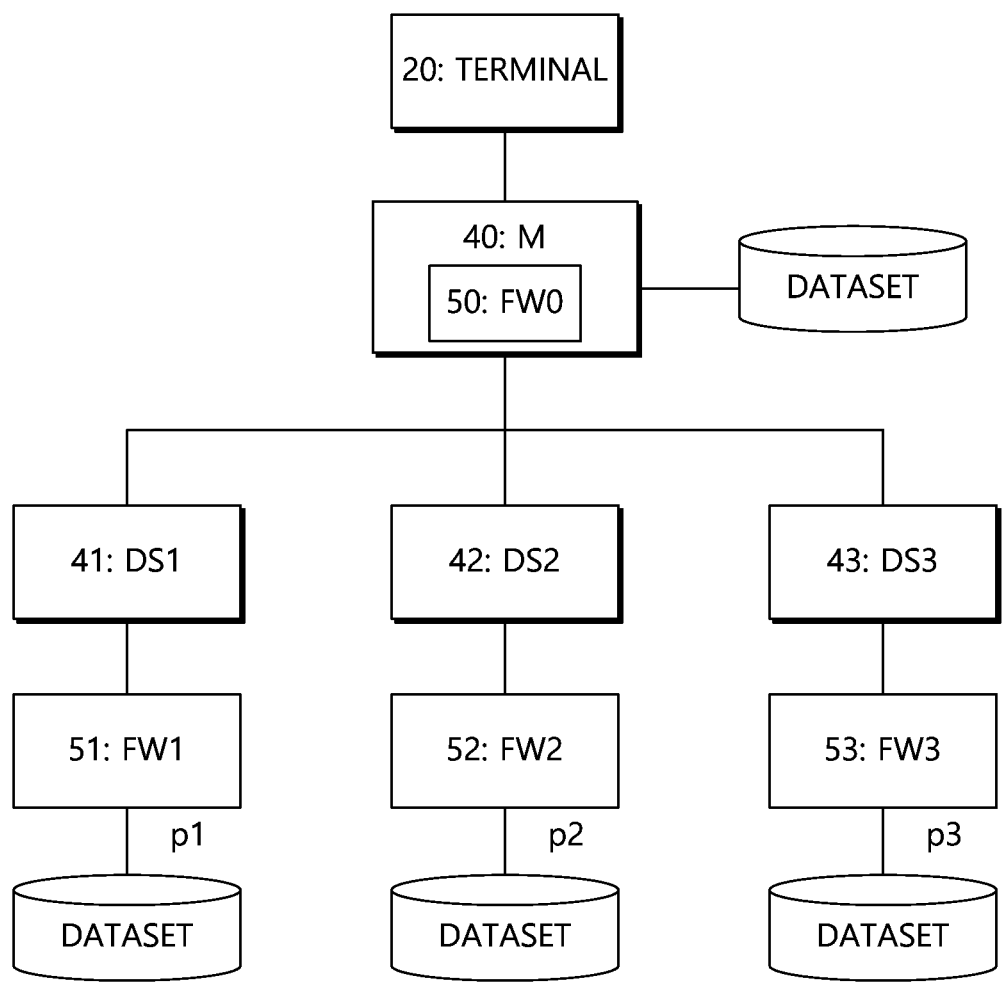
FIG. 10 is a block diagram schematically illustrating a database-linkage distributed deep learning system according to another embodiment of the present invention.
Figure 11:
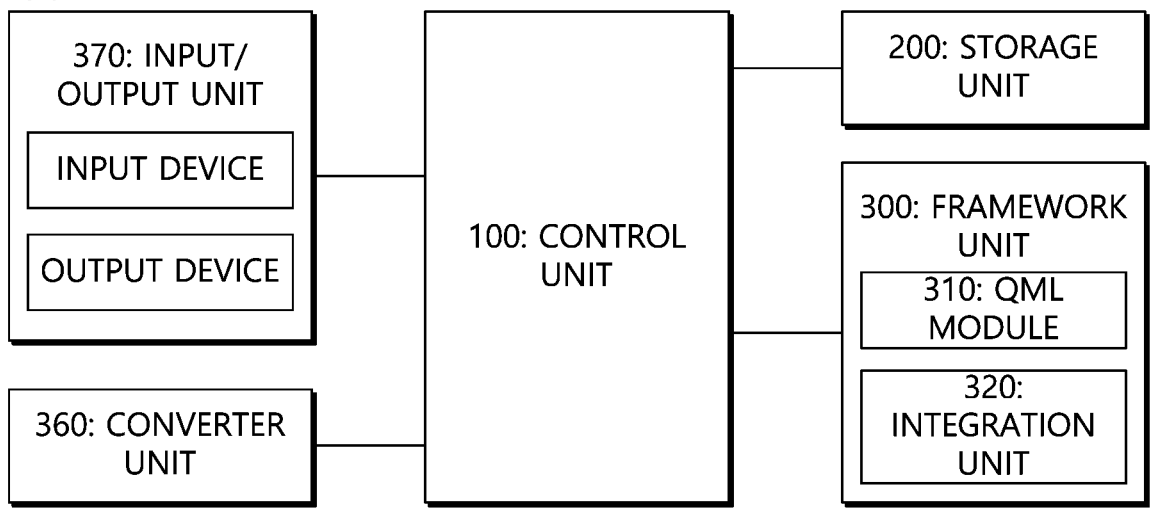
FIG. 11 is a block diagram of a main server and distributed servers of FIG. 10.
Figure 11:
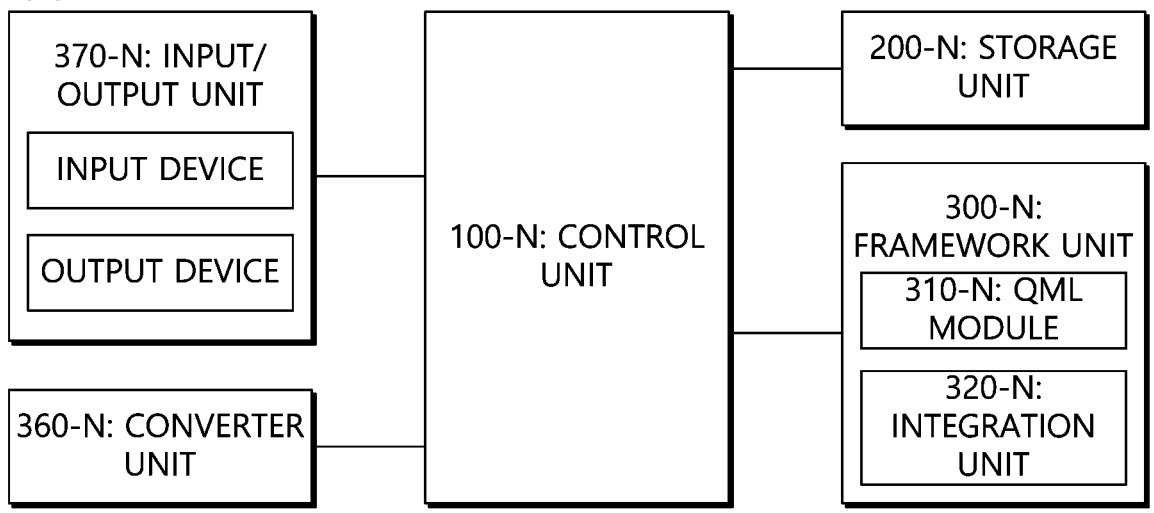
Figure 13:
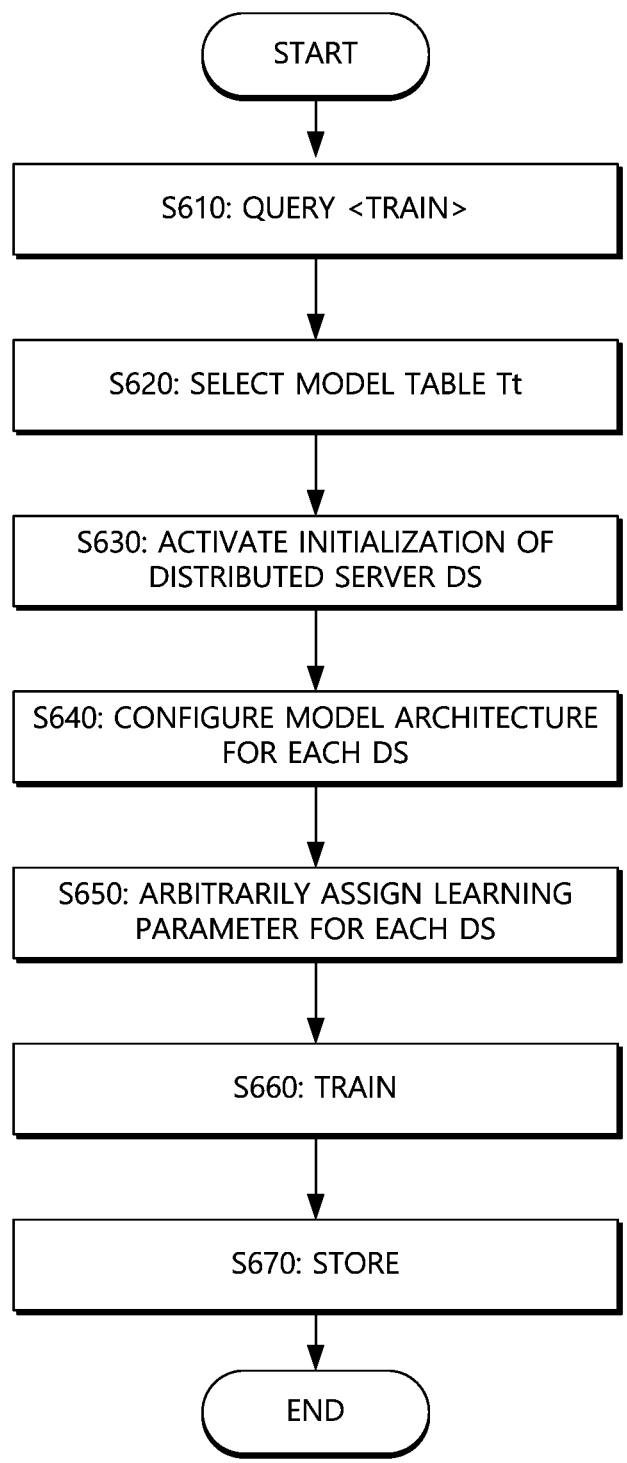
FIG. 13 is a flowchart illustrating a training method of the system of FIG. 10.
Figure 14:
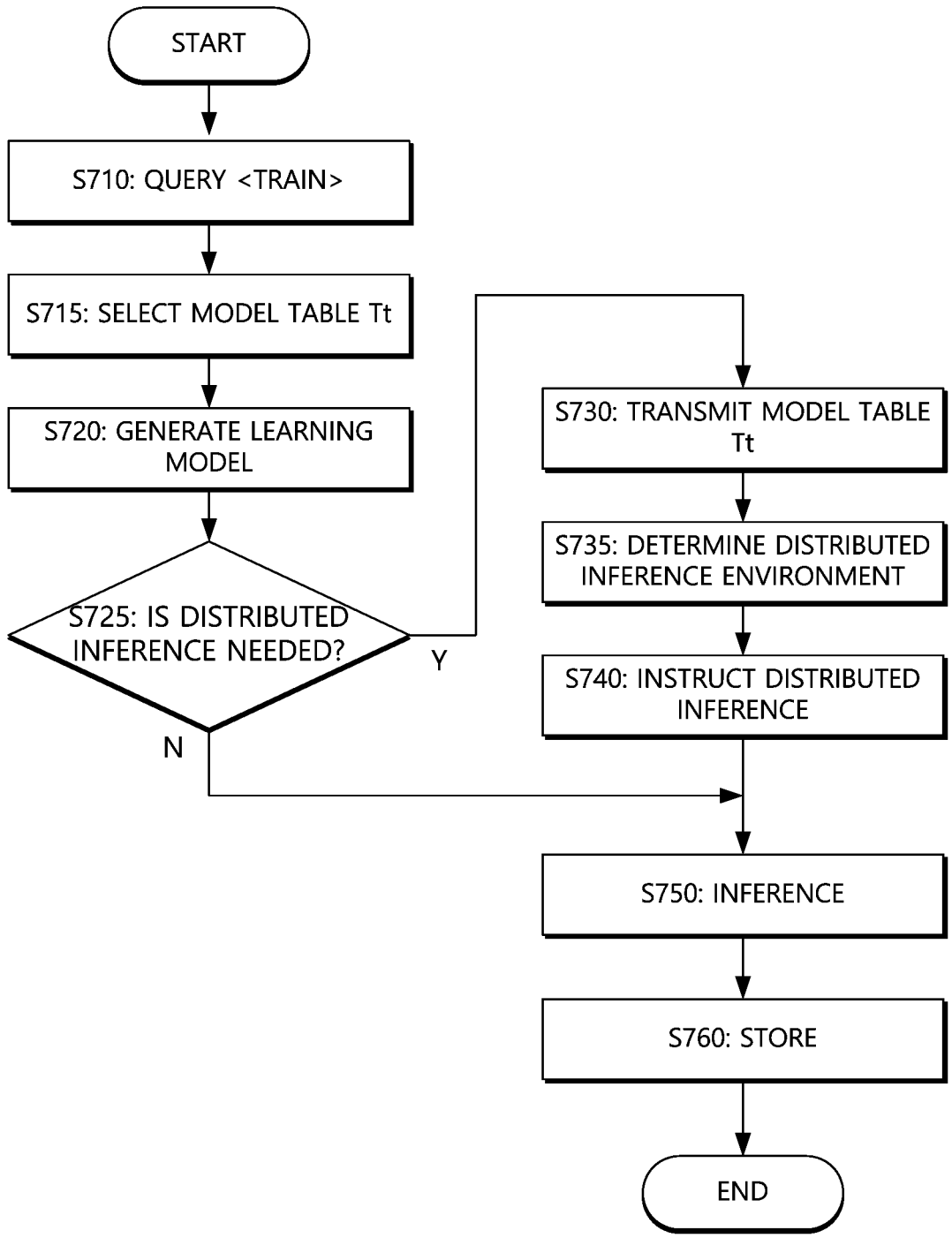
FIG. 14 is a flowchart illustrating an inference method of the system of FIG. 10.
Figure 15:
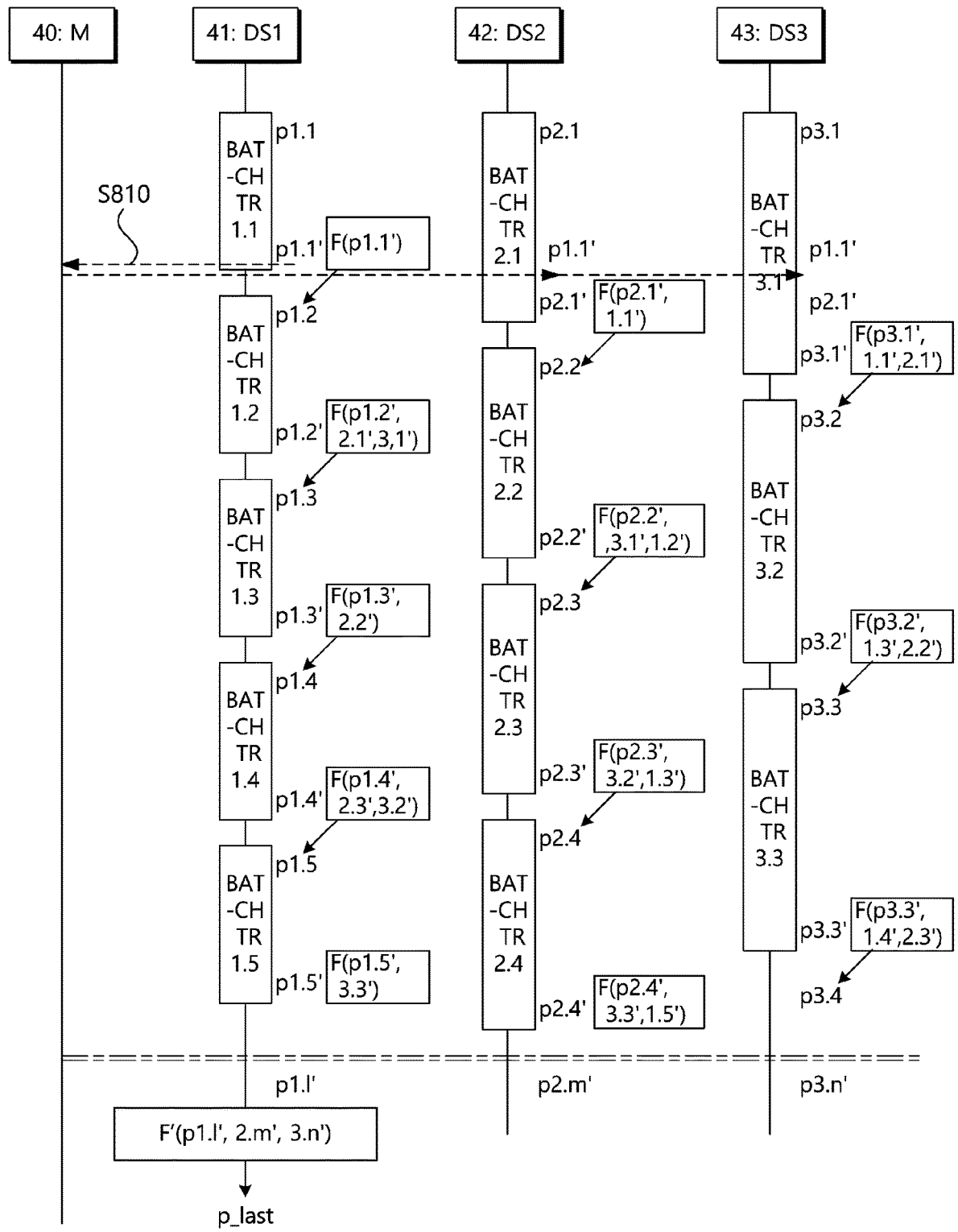
FIGS. 15 to 17 are signal flow diagrams according to different embodiments of an asynchronous distributed server of FIG. 13.
Figure 16:
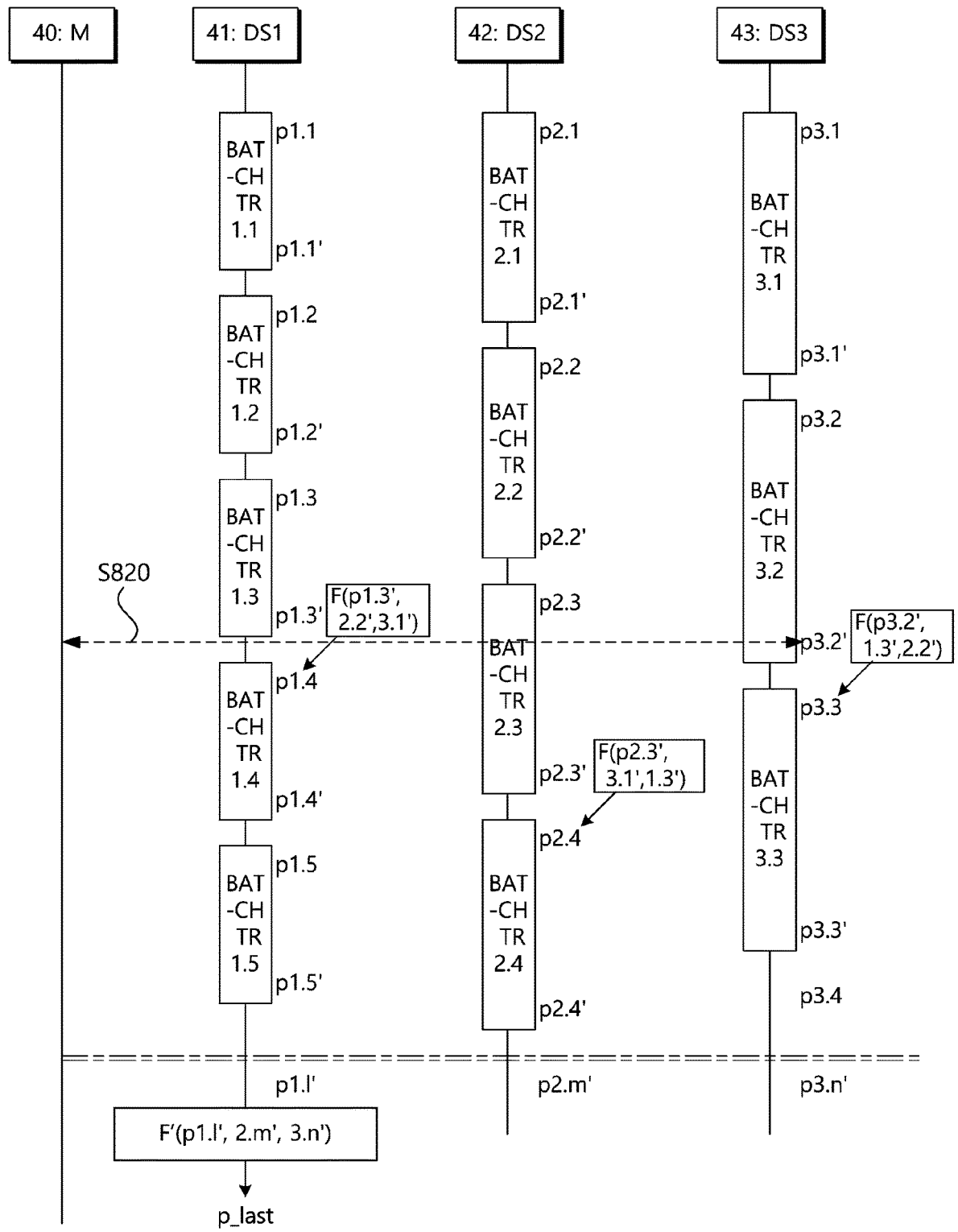
Figure 17:
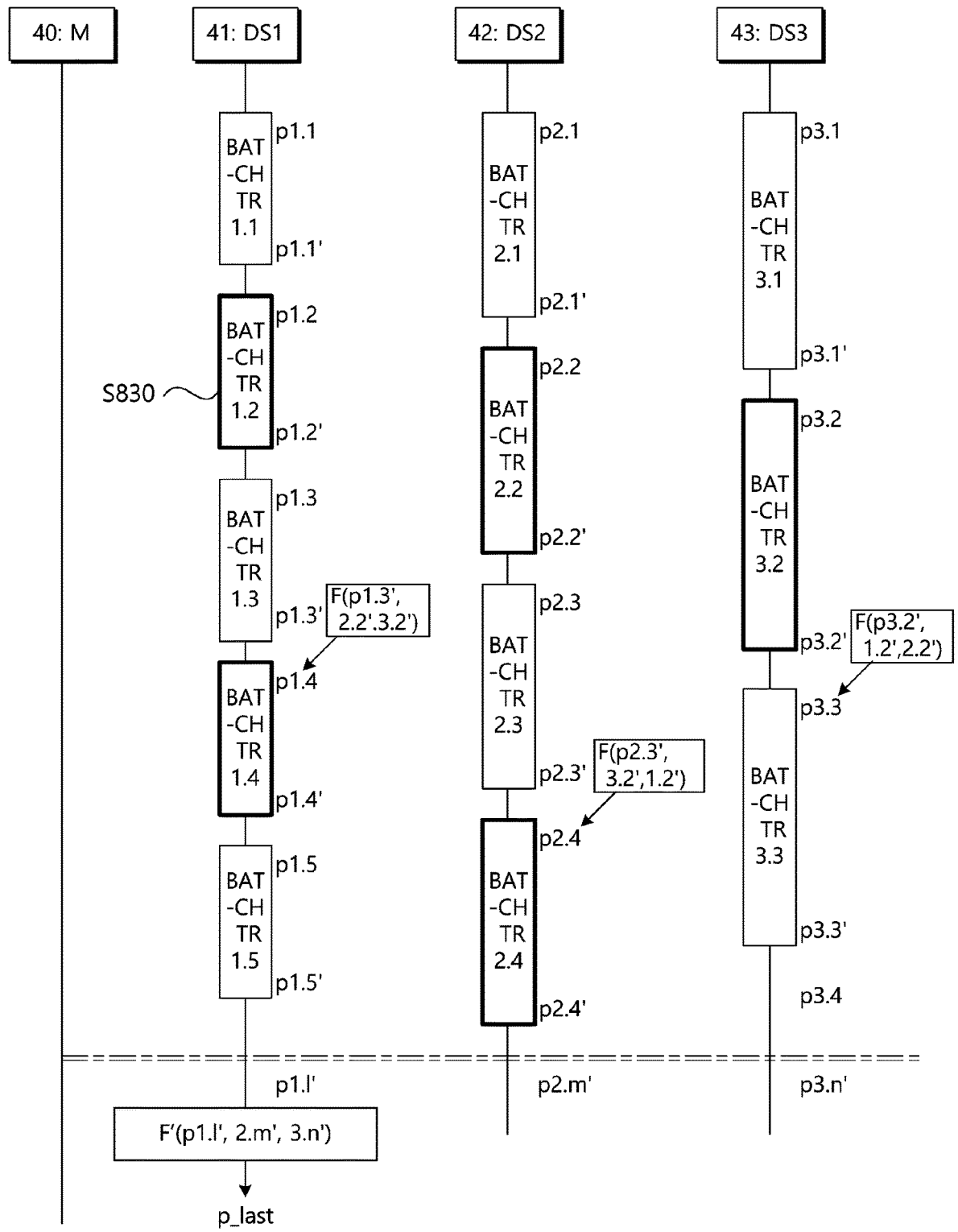
Figure 18:
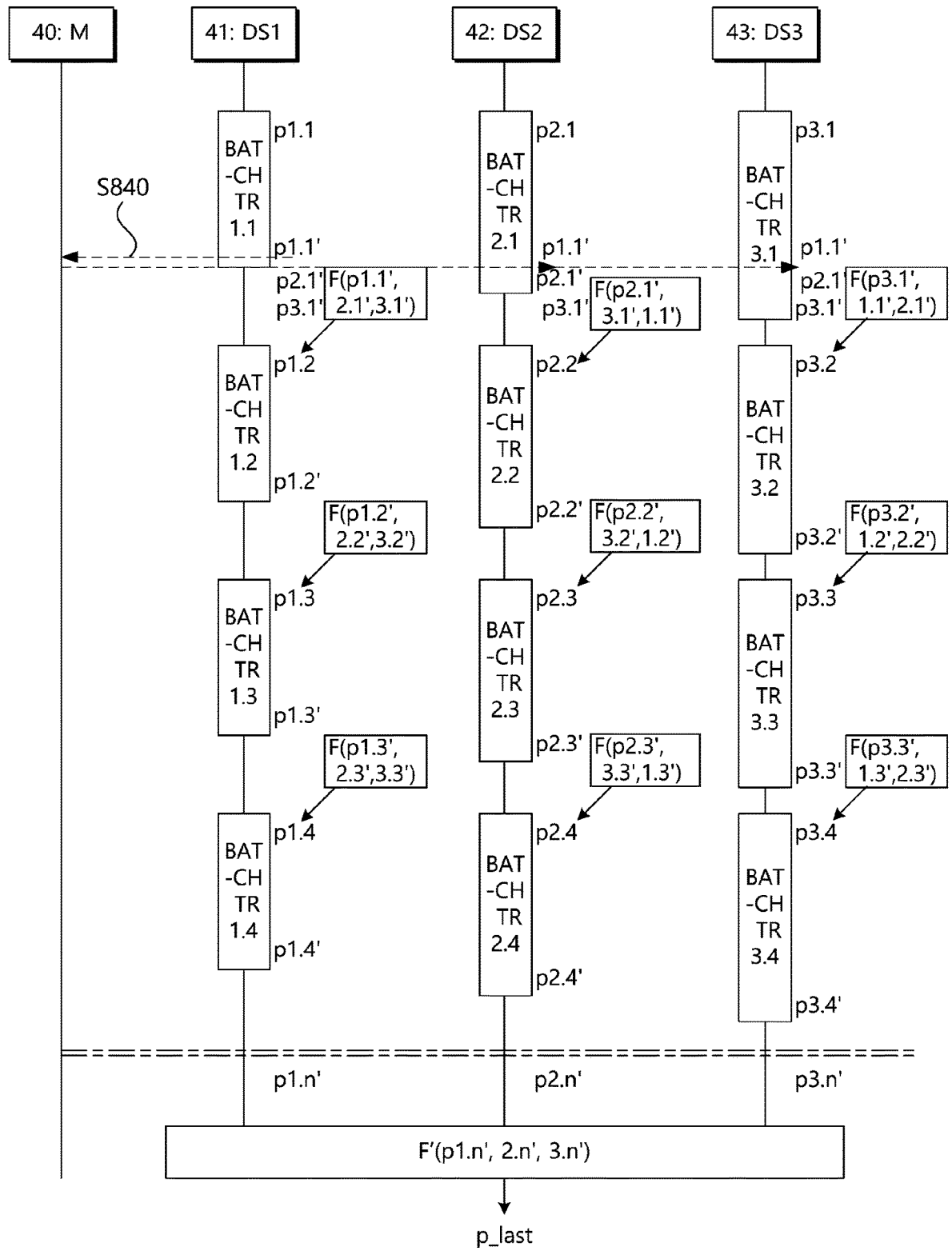
FIGS. 18 and 19 are signal flow diagrams according to different embodiments of the synchronous distributed server of FIG. 13.
Figure 19:
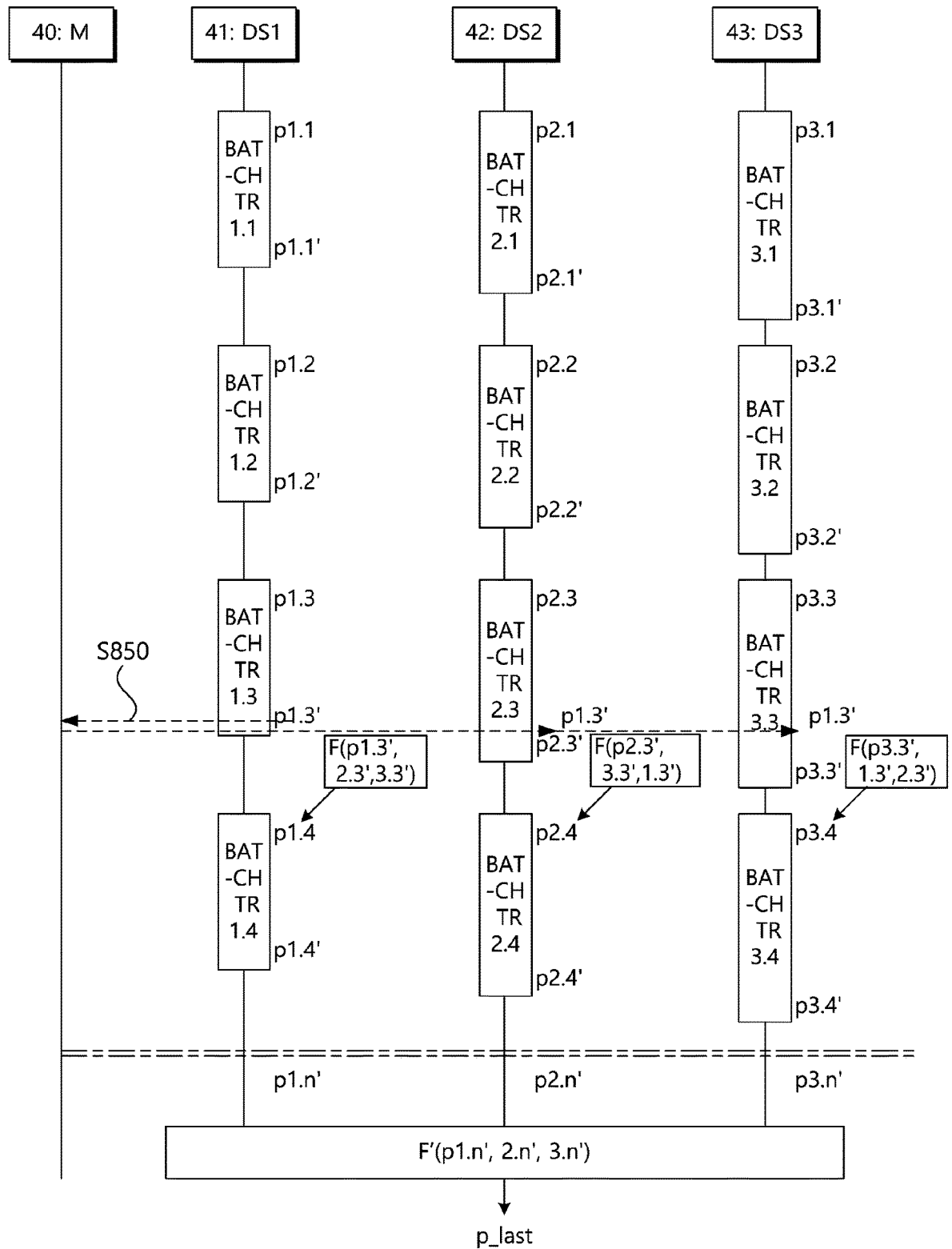
Figure 20:
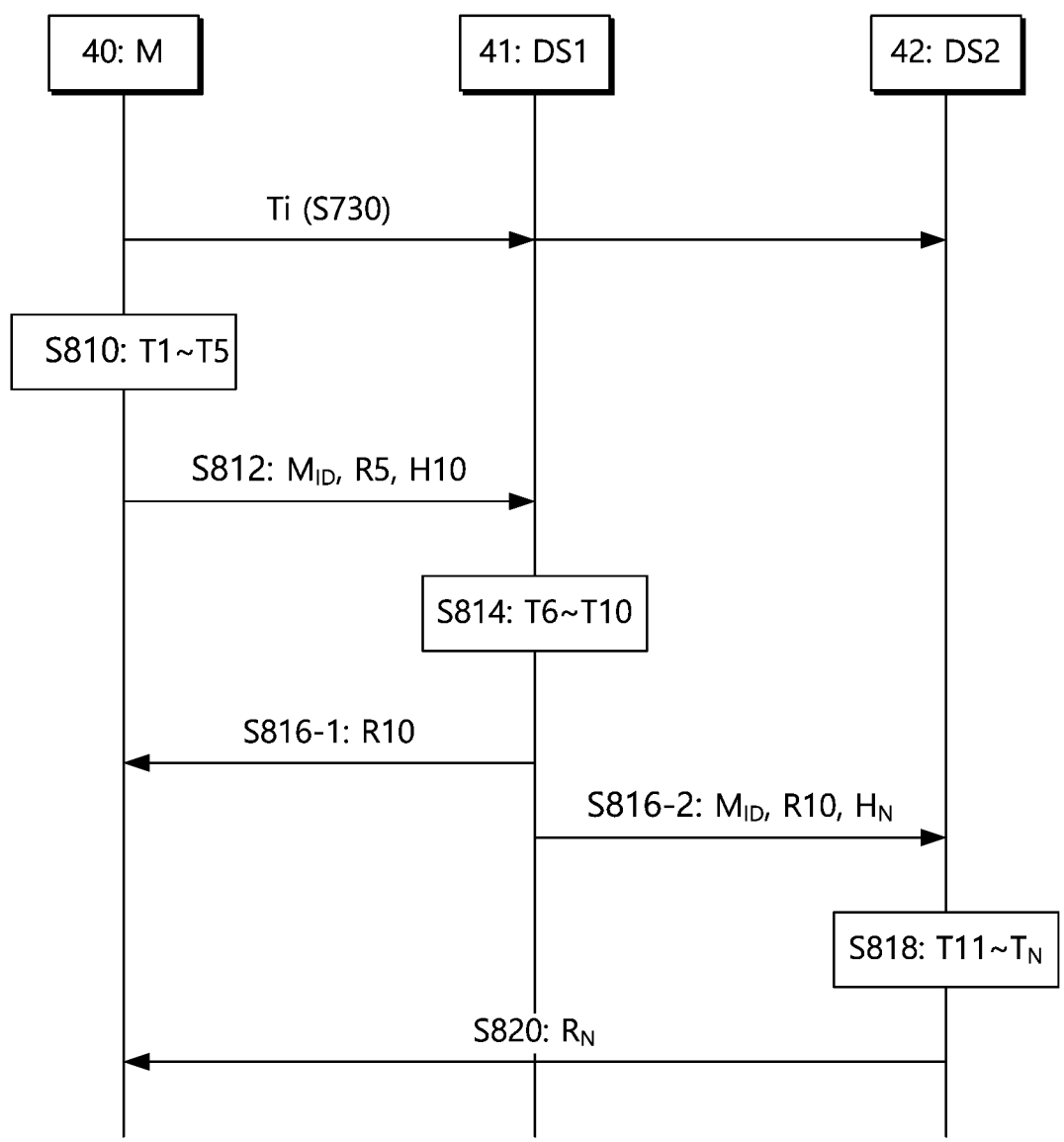
FIG. 20 is a signal flow diagram according to distributed inference of FIG. 14.
Figures 21, 22:
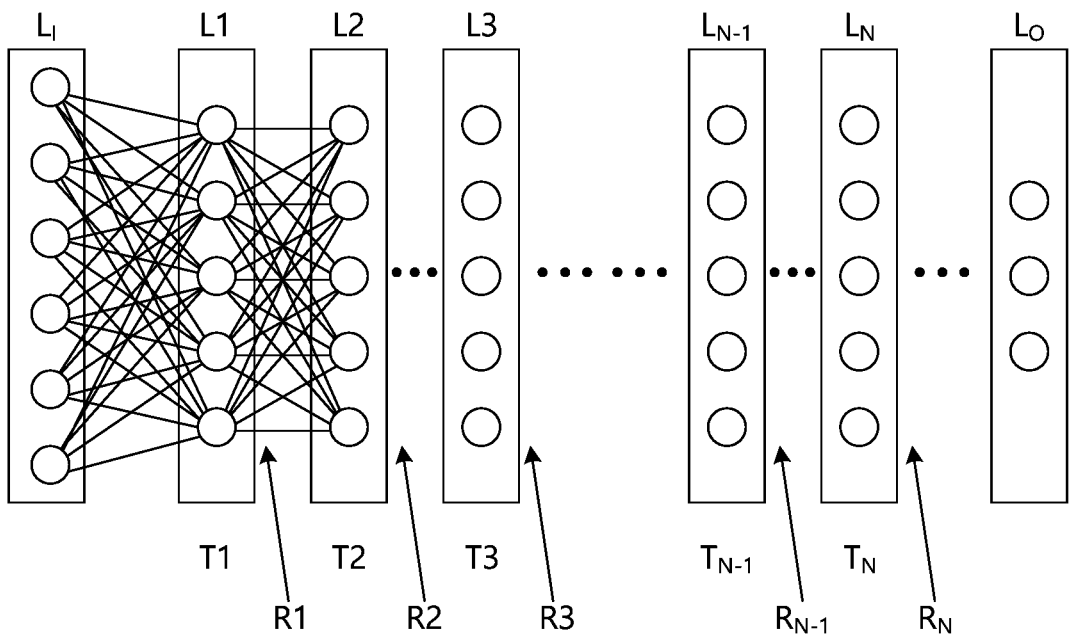
FIG. 21 schematically illustrates a learning model.
FIG. 22 illustrates a portion of an intermediate result table according to FIG. 20.

FIG. 10 is a block diagram schematically illustrating a database-linkage distributed deep learning system according to another embodiment of the present invention. FIG. 11 is a block diagram of a main server and distributed servers of FIG. 10. FIG. 12 illustrates a dataset of a main server and datasets for training of distributed servers. FIG. 13 is a flowchart illustrating a training method of the system of FIG. 10. FIG. 14 is a flowchart illustrating an inference method of the system of FIG. 10. FIGS. 15 to 17 are signal flow diagrams according to different embodiments of an asynchronous distributed server of FIG. 13. FIGS. 18 and 19 are signal flow diagrams according to different embodiments of the synchronous distributed server of FIG. 13. FIG. 20 is a signal flow diagram according to distributed inference of FIG. 14. FIG. 21 schematically illustrates a learning model. FIG. 22 illustrates a portion of an intermediate result table according to FIG. 20. FIG. 23 illustrates a portion of a network table. The following description refers to FIGS. 1 to 9.

For the convenience of explanation, a learning model is defined as follows. The learning model (learning network model) may be realized by an architecture (model architecture) and learning parameters assigned thereto. The architecture may be constructed based on architecture structure and hyperparameters assigned thereto. The learning model and learning model table may correspond to each other, the architecture and architecture table may correspond to each other, the architecture structure and network table may correspond to each other, the hyperparameters and hyperparameter table may correspond to each other, and the training parameters and training parameter table may correspond to each other. In addition, the learning model table may include the architecture table and training parameter table. The architecture table may include the network table and hyperparameter table. The architecture structure may signify the number of layers, number of units, layer types, and how units are connected.

A unit may also be referred to as a node. The values to be input into initial nodes may be an input dataset table. The values to be input into the final nodes may be output values. The input and output values for nodes of intermediate layers (hidden layers) may be managed and stored by the dataset management module 120 or a separate module.

The framework unit or internal framework (hereinafter referred to as "framework unit") may construct a model architecture based on the architecture table (network table and hyperparameter table) of the selected learning model table, and assign learning parameters, based on the learning parameter table, to the model architecture, thus creating a learning model corresponding to the selected learning model table. The framework unit may use the generated learning model to perform deep learning training or inference with dataset tables for training or inference. The learning model table and the learning model may be described as interworking with, corresponding to, or being converted to each other, but are not limited to these terms.

Referring to FIG. 10, a database-linkage distributed deep learning system (hereinafter referred to as "distributed training system") according to an embodiment of the present invention may include a query-based deep learning framework application database server (hereinafter referred to as a "main server") 40 and a plurality of distributed servers 41 to 43.

The main server 40 and the plurality of distributed servers 41 to 43 may have at least some of the functions of the DB server 10 shown in FIGS. 1 to 9. The components of the main server 40 and the plurality of distributed servers 41 to 43 corresponding to the components of the DB server 10 refer to the above description.

The main server 40 and the plurality of distributed servers 41 to 43 may be connected to each other through a network and communicate with each other.

The main server 40 may manage the plurality of distributed servers 41 to 43 to facilitate distributed training of deep learning.

Referring to FIG. 11(a), the main server 40 may include a control unit 100, a storage unit 200, and an input/output unit 370. The main server 40 may further include a converter unit 360. The main server 40 may further include a framework unit 300.

Referring to FIG. 11(b), the distributed servers 41 to 43 may each include a control unit 100-N, a storage unit 200-N, a framework unit 300-N, and an input/output unit 370-N. The distributed server 41 to 43 may each further include a converter unit 360-N. Here, N is a natural number used to distinguish a specific distributed server among the plurality of distributed servers 41 to 43.

Each component of the main server 40 and distributed servers 41 to 43 refers to the description provided above with reference to FIGS. 1 to 9.

The main server 40 may implement the functions of the database server 10 shown in FIGS. 1 to 9, and may additionally implement a distribution function. For example, the main server 40 may serve to manage the entire distributed system and may additionally perform a distribution function. However, for ease of description, the distribution function of the main server 40 is treated as being executed on any one of the distributed servers.

A main framework unit 50 of the main server as depicted in FIG. 10, and first to third framework units 51 to 53 of the respective distributed servers correspond respectively to the aforementioned framework unit 300 and are used for the purpose of differentiation.

Any one of the plurality of distributed servers may be implemented as multiple computer systems (server systems).

The main server 40 may set the plurality of distributed servers 41 to 43 such that each distributed server performs deep learning training in the same environment. The main server 40 may make at least some of the datasets, learning models, or frameworks of the plurality of distributed servers 41 to 43 identical.

The first to third distributed servers 41 to 43 may include first to third framework units 51 to 53, respectively. The first to third framework units 51 to 53 may include frameworks (QML modules) to be trained and perform machine learning with the same learning model. The fact that each of the first to third distributed servers 41 to 43 has the same learning model may imply that at least their architectures are the same. Learning parameters p1, p2, and p3 of the respective distributed servers 41 to 42 may differ from one another.

Each distributed server 41 to 42 may initialize its learning parameters separately to have different initial learning parameters. Alternatively, by the main server 40, the plurality of distributed servers 41 to 43 may include the same initial learning parameters. In other words, the initial values of the learning parameters may be determined by the main server 40 or independently by each of the distributed servers 41 to 43. The determination of initial values may be optional and may depend on various factors such as the nature of datasets, such as type and number, and the purpose of deep learning.

Each of the first to third distributed servers 41 to 43 may be equipped with the same dataset as the main server 40. The provisioning of identical datasets may be performed using a method of transmitting data from the main server 40 to the plurality of distributed servers 41 to 43 or a method of synchronizing specific data between the main server 40 and the plurality of distributed servers 41 to 43 through mirroring. Such data movement (propagation) methods may apply not only to datasets but also to other information (such as learning parameters).

Each dataset of the plurality of distributed servers 41 to 43 may be transformed into a learning dataset DS suitable for learning. In this case, the transmission efficiency may be higher than when the main server 40 prepares and transmits individual learning datasets DS tailored for each of the datasets to the respective multiple distributed servers 41 to 43. This is because broadcasting transmission is possible.

After receiving datasets identical to the dataset shown in FIG. 12(*a*), each of the plurality of distributed servers 41 to 43 may perform shuffling by randomly changing the order of each data. The plurality of distributed servers 41 to 43 may divide the shuffled data into mini-batches b1 to b10 appropriately according to the batch size and transform them into learning datasets DS as shown in (b-1) to (b-3) of FIG. 12. The batch size may be received from the main server 40.

The framework unit 300 may further include an integration unit 320 in addition to the above-described QML module 310.

The integration unit 320 may integrate learning parameters derived during the distributed learning process into a single learning parameter. The function used for integration by the integration unit 320 may vary. For example, an integration function may multiply weights to each of the derived multiple learning parameters, and then output the average of these.

Regarding which, among learning parameters derived from a specific distributed server and shared learning parameters from other distributed servers, will be used as arguments of the integration function F by the integration unit 320, various argument policies (or "integration policies") may be applied. Optionally, the argument policies may be determined by user settings.

Examples of integration policies are as follows.

The integration unit 320 may use the most recent learning parameters as arguments for the integration function F. In other words, once a learning parameter has been used, it cannot be used as an argument for the integration function F unless it is shared anew.

When the integration unit 320 has not received learning parameters from other distributed servers, it may execute the integration function F without other learning parameters.

When the learning parameter of the integration unit 320 is the only argument for the integration function F, the integration unit 320 may to execute the integration function F. In this case, the learning parameter derived from the current batch learning may be used as a learning parameter in the next batch learning.

The integration unit 320 may choose to execute the integration function F only when all the learning parameters corresponding to the number of arguments are the most recent, or even when at least one of the learning parameters from other distributed servers is the most recent. Assuming there are 3 arguments, in the former case, if all 3 learning parameters are the most recent parameters, all 3 learning parameters are used as arguments; otherwise, only its own learning parameter is used as an argument. In the latter case, if only 2 out of the learning parameters are the most recent parameters, only those 2 learning parameters are used as arguments. The user may set the integration function F to be executed only when all arguments are present or even when some arguments are present.

Hereinafter, deep learning in a distributed environment will be described in detail.

The first to third framework units 51 to 53 may generate a learning model architecture with the same architecture structure and hyperparameters and use each learning dataset DS to prepare for machine learning (deep learning) training. The first to third framework units 51 to 53 may respectively set initial values of the learning parameters p1, p2, and p3 such as weights or biases for the learning models.

Once the preparation for deep learning training is complete, each of the plurality of framework units 51 to 53 may perform deep learning training. Each of the plurality of framework units 51 to 53 may iterate through deep learning training using its respective corresponding learning dataset DS. Each of the plurality of framework units 51 to 53 may update (derive) parameters, especially learning parameters, after training for each mini-batch b1 to b10. Throughout this specification, the training or learning of each mini-batch will be referred to as "batch learning" or "batch training".

For example, the first framework unit 51 may be trained using an initial learning parameter p1-1 and the first mini-batch b1 and may derive a learning parameter p1-1' updated (transformed) through training. The derived learning parameter p1-1' may be spread, for example, by being transmitted to or synchronized with the second or third distributed servers 42 to 43.

The learning parameters derived from each framework unit may be spread (or "shared") in various ways, which may vary based on policies or user settings. For example, an immediate sharing policy where as soon as each batch learning ends in a certain framework unit, its latest learning parameter is spread to the other framework units, a time period-based sharing policy where the latest learning parameter is spread to other framework units after a predetermined time period, a learning cycle-based sharing policy where the latest learning parameter is spread after a predetermined number of batch learnings, and other rule-based policy where parameters are spread according to rules defined by the main server 40 or random directives from the main server 40.

The integration unit 320 of the first framework unit 51 may integrate the learning parameters derived from the second and third framework units 52 and 53, as well as the first learning parameter p1-1' derived from the first framework unit 51, into a single learning parameter p1-2. The integration unit 320 of the first framework unit 51 is preferably designed to ensure that the calculated first learning parameter p1-1' has a greater impact on the output of the integration function by a method such as assigning a weight to the first learning parameter p1-1' calculated by the first framework unit 51.

The first framework unit 51 may update the learning parameters of the learning model to the integrated learning parameter p1-2. Afterward, using the integrated learning parameter p1-2 and the second mini-batch b2, the first framework unit 51 may perform deep learning training. Once a single epoch, which involves learning (deep learning training) on all mini-batches (learning datasets DS), is completed, the first framework unit 51 may repeat the learning process until the predefined number of epochs or conditions specified by a predetermined policy are satisfied. During a single epoch, a series of updates (iterations) of the learning parameters may occur, where the number of updates corresponds to the division of the entire dataset size by the batch size. Referring to b-1 to b-3 of FIG. 12, with a dataset size of 80 and a batch size of 8, there will be 10 iterations during a single epoch.

The first framework unit 51 may ensure that the learning dataset DS is shuffled when a single epoch is completed.

Upon the completion of sub-process of deep learning training, the first framework unit 51 may tune the architecture's structure or hyperparameters. The learning dataset may be divided into training, validation, and test datasets. Examples of a sub-process in deep learning training may include a learning process (training, validation, testing) of the distinguished datasets described above.

The hyperparameters tuned in the first framework unit 51 may be spread to other distributed servers. These other servers may reconstruct the learning model architecture using the tuned hyperparameters. It is desirable for hyperparameter tuning to occur only on a single distributed server.

Before the next sub-process of deep learning training begins, each learning parameter may be readjusted, similar to being initialized, or may maintain its previous value.

Referring to FIG. 13, the main server 40 may receive a deep learning query of a specific function from the user (S610). The main server 40 may receive the query directly through the input/output unit 370 or through the terminal 20.

The main server 40 may select a learning model table suitable for the train query (S620). The main server 40 may analyze the query to select a suitable learning model table (hereinafter referred to as "learning model table, Tt") from a plurality of learning model tables. The training model table may be selected by a learning model management module 130 of the main server 40 according to the aforementioned model selection policy.

The learning model table Tt may be a learning model generated in an external framework and imported by the converter unit 360.

The main server 40 may include a learning dataset table. The main server 40 may receive data of the learning dataset through a query or from another device.

The main server 40 may activate initialization of the plurality of distributed servers 41 to 43 (S630).

Activation of initialization may involve a series of processes that set a distributed environment to suit distributed deep learning training and prepare the plurality of distributed servers 41 to 43 for distributed training to be possible.

Activation of initialization may include selecting an appropriate distributed server from a plurality of available distributed servers 41 to 43. Activation of initialization may allow for connecting the first to third distributed servers 41 to 43 through a network and propagating data to the first to third distributed servers 41 to 43 through synchronization, asynchronous methods, and/or mirroring.

The distributed environment may include the batch size of the learning dataset DS. Based on the number of distributed servers, specifications of the distributed servers, the learning datasets DS, and/or queries, the main server 40 may determine an appropriate batch size.

The distributed environment may further include the appropriate number of epochs. The distributed environment may further include a learning query. The learning query included in the distributed environment may contain analyzed content, such as a query function.

The main server 40 may propagate the distributed environment, training model table Tt, and/or training dataset DS table to the first to third distributed servers 41 to 43. The distributed environment may have a relational data structure. The distributed environment may belong to the training model table.

After data propagation, the first to third distributed servers 41 to 43 may each have the same distribution environment, learning model table Tt, and learning dataset (DS) table.

Each of the first to third distributed servers 41 to 43 may modify its respective training dataset DS table to suit the learning. For example, the first distributed server 41 may randomly change the order of the data of the learning dataset DS, then divide the data according to the batch size. The shuffled and divided dataset may be stored in a batch dataset table. The dataset divided into each batch size in the batch dataset table may be referred to as "batch data" or "mini-batch".

It is preferable for each of the first to third distributed servers 41 to 43 to have different initial values for their respective learning parameter tables. This is because different learning parameters enable the execution of deep learning training with various settings. For this purpose, the first to third distributed servers 41 to 43 may randomly set the initial values of the learning parameters. Various initialization techniques may be used for initializing the learning parameters.

The initialized first to third distributed servers 41 to 43, respectively, may construct a model architecture suitable for the corresponding first to third framework units 51 to 53, which are installed as plug-ins, using the architecture table belonging to the appropriate learning model table (S640).

The first to third framework units 51 to 53 may assign initial learning parameters to each constructed model architecture to prepare for training the learning model (S650).

The first to third framework units 51 to 53 (e.g., each QML module 310) may be trained using the model architecture to which the training mini-batches and learning parameters are allocated (S660).

For integration of updated learning parameters from each distributed server, both an asynchronous learning method, where each distributed server independently performs batch learning, and a synchronous learning method, where batch learning starts periodically together, may be employed.

Due to differences in computing resources or specifications, the time required by the distributed servers for batch learning may vary.

The asynchronous learning method allows continuous batch learning without downtime regardless of the batch learning schedule on other distributed servers, enabling efficient utilization of computing resources. Furthermore, by implementing a policy where when any one of distributed servers finally ends machine learning, the other distributed servers also terminate, the total learning time can be further reduced compared to a synchronous learning method.

The synchronous learning method involves sharing the updated final learning parameters after the same number of batch leanings on each distributed server, which may result in a better degree or efficiency of distributed learning compared to the asynchronous learning method.

The user may choose between the synchronous and asynchronous learning methods depending on the type and target of machine learning. Hereinafter, synchronous and asynchronous learning methods will be described in detail.

An embodiment of the asynchronous learning method is described with reference to FIG. 15. FIG. 15 illustrates an embodiment according to the "immediate sharing policy" mentioned above, where as soon as each batch learning ends in each framework unit, its latest learning parameter is spread to the other framework units. The integration policy according to this embodiment follows a policy where when at least one other learning parameter is the most recent, the learning parameter is used as an argument.

Each of the first to third framework units 51 to 53 may obtain each batch data (mini-batches b1 to b10) until the end of learning, and perform iterative learning on the obtained batch data. Each iteration of learning is referred to as "batch learning" (batch TR).

The first framework unit 51 may perform 1.1 batch learning on the model architecture to which 1.1 parameter p1.1 is assigned. Upon completing the 1.1 batch learning, the first framework unit 51 may derive learned 1.1' parameter p1.1'.

The first framework unit 51 may spread the learned 1.1' parameter p1.1' to the second and third distributed servers 42 and 43 (S810). The spreading may occur through direct transmission from the first distributed server 41 to the remaining distributed servers 42 and 43, synchronization or mirroring through the main server 40, or the like. For efficient data management and consistency, synchronization or mirroring is preferable for spreading. While this embodiment illustrates the spreading of the learning parameter from the first distributed server 41 to the second and third distributed servers 42, 43 after learning is completed, it is not limited thereto. For example, after learning concludes in the third framework unit 53, which requires the longest time for learning, the respective derived learning parameters p1.1', p2.1', and p3.1' may be spread to different distributed servers 41, 42, and 43.

The integration unit 320 of the first framework unit 51 may integrate the most recent learning parameters (other learning parameters) derived by other distributed servers 42 and 43 after batch learning, along with the learning parameters derived by the first framework unit 51, through appropriate transformations F to create an integrated learning parameter for the next batch learning.

Among the other learning parameters, those used before the most recent completed batch learning in the integration unit 320 may be excluded. In other words, only the latest learning parameters may be used.

The first framework unit 51 may update the integrated learning parameter to be used as the learning parameter for the next batch learning and may proceed with the next batch learning.

For example, in the case where the completion of the 1.1 batch learning (batch TR 1.1) in the first framework unit 51 and no spread learning parameters from other distributed servers 42 and 43 exist, the integration unit 320 of the first framework unit 51 may designate the 1.1' parameter p1.1' as a 1.2 parameter p1.2 to be used in the subsequent 1.2 batch learning.

The first framework unit 51 may calculate a 1.3 parameter p1.3 by focusing on a 1.2' parameter p1.2' derived after the completion of 1.2 batch learning and integrating it with the 2.1' and 3.1' parameters spread respectively from the second and third distributed servers 42 and 43.

A function F used in the integration process preferably focuses on the learning parameter derived from the corresponding framework unit, while integrating the other remaining parameters as secondary components. For example, the integration unit 320 of the first framework unit 51 may multiply a high weight to the 1.2' parameter p1.2' and a low weight to the remaining parameters p2.1' and p3.1' to derive the 1.2 parameter p1.2. Here, the sum of weights is preferably equal to 1. Depending on the number of arguments (learning parameters) and the progress of learning, the individual magnitudes of the weights applied to each argument may vary.

After 1.3 batch learning using the 1.3 parameter p1.3, the first framework unit 51 may derive a 1.3' parameter p1.3'. After the 1.3 batch learning, the first framework unit 51 has the 1.3', 2.2', and 3.1' parameters p1.3, p2.2, and p3.1' as the most recent parameters. In this case, the 3.1' parameter p3.1' is excluded as it was used after the completion of the 1.2 batch learning. Accordingly, the first framework unit 51 may integrate the 1.3' and 2.2' parameters p1.3' and p2.2' to calculate a 1.4 parameter p1.4.

An example of the need for the latest among the spread learning parameters is shown in the integration stage following 2.4 batch learning of the second distributed server 42. Until the completion of the 2.4 batch learning after the 2.3 batch learning, the second framework unit 52 may receive the 1.3' learning parameter p1.3' and 1.4' learning parameter p1.4' spread from the first distributed server 41. Since the 1.4' learning parameter p1.4' is the most recent, the integration unit 320 of the second framework unit 52 may integrate using the 1.4' learning parameter p1.4' instead of the 1.3' learning parameter p1.3'.

According to this embodiment, the first to third distributed servers 41 to 43 may asynchronously perform batch learning and integration of learning parameters. In other words, the first distributed server 41 may proceed with the next batch learning independently of the completion of batch learning in the other distributed servers 42 and 43. As a result, it is possible to efficiently use computing resources of the multiple distributed servers 41 to 43. The length of time required for batch learning by each server inevitably varies due to differences in specifications or operational environments of the servers. However, in the case of this synchronous learning method, it is possible to efficiently utilize computing resources by not waiting for the completion of batch learning on other distributed servers.

The final trained learning parameter p_last may be calculated by the integration unit 320 of the first framework unit 51. The integration unit 320 of the first framework unit 51 may calculate the trained learning parameter p_last by perform integration F based on at least one of 1.l', 2.m', and 3.n' learning parameters p1.l', p2.m', and p3.n' (where l, m, n are natural numbers). The function F' used in this final integration may differ from the integration function F used during training.

It is preferable that the final integration function F' does not assign discriminative weights to each argument. It is preferable for the final integration function F' to exhibit less discrimination among individual arguments, even if applying discriminative weights to each argument, compared to the aforementioned integration function F. In this case, it is preferable to assign higher weights to those that conclude learning earlier and lower weights to those that conclude learning later.

As seen in this embodiment, it is preferable to derive (integrate) the final learning parameter p_last in the first distributed server 41 where batch learning ends the earliest. That is, a value of 'l' is greater than the values of 'm' and 'n'. Once batch learning in the first framework unit 51 ends (all epochs are finished), batch learning in the second and third framework units 52 and 53 may terminate independently of the remaining iterations. In this case, time may be further reduced compared to a synchronous learning method under the same conditions.

Another embodiment of the asynchronous learning method is described with reference to FIG. 16. FIG. 16 illustrates an embodiment according to the time period-based sharing policy mentioned above, where the final updated learning parameter is spread to other framework units after a predetermined time period. The integration policy in this embodiment is an example where learning parameters are used as arguments only when all the learning parameters are the most recent. The following description also refers to FIG. 15.

Each of the first to third framework units 51 to 53 may obtain each batch data (mini-batches b1 to b10) until the end of learning, and repeat batch learning (batch TR).

The first framework unit 51 may perform 1.1 batch learning on the model architecture to which 1.1 parameter p1.1 is assigned. Upon completing the 1.1 batch learning, the first framework unit 51 may derive learned 1.1' parameter p1.1'. The derived 1.1' parameter p1.1' may be directly used for 1.2 batch learning. Thus, the integration unit 320 of the first framework unit 51 may not need to execute the integration function F. The 1.2 parameter p1.2 has the same value as the 1.1' parameter p1.1'.

In this way, each distributed server DS1 to DS3 may independently perform batch learning until the learning parameters are spread.

Each of the framework units 51 to 53 may spread the latest learning parameters at a specific period or at a specific time instructed by the main server 40 (S820). In this embodiment, the first framework unit 51 may spread a 1.3' learning parameter p1.3', the second framework unit 52 may spread a 2.2' learning parameter p2.2', and the third framework unit 52 may spread a 3.1' learning parameter p3.1' to other distributed servers.

After the spread of learning parameters, each framework unit may integrate the parameters before the next batch learning.

For example, the first framework unit 51 may calculate a 1.4 parameter p1.4 by focusing on a 1.3' parameter p1.3' derived after the completion of 1.3 batch learning and integrating it with the 2.2' and 3.1' parameters spread respectively from the second and third distributed servers 42 and 43. The second framework unit 52 may calculate a 2.4 parameter p2.4 by focusing on a 2.3' parameter p2.3' derived after the completion of 2.3 batch learning and integrating it with the 3.1' and 1.3' parameters spread respectively from the third and first distributed servers 43 and 41. The third framework unit 53 may calculate a 3.3 parameter p3.3 by focusing on a 3.2' parameter p3.2' derived after the completion of 3.2 batch learning and integrating it with the 1.3' and 2.2' parameters spread respectively from the first and second distributed servers 41 and 42.

The final trained learning parameter p_last may be calculated by the integration unit 320 of the first framework unit 51. The integration unit 320 of the first framework unit 51 may calculate the trained learning parameter p_last by performing integration F' based on 1.l', 2.m', and 3.n' learning parameters p1.l', p2.m', and p3.n' (where l, m, n are natural numbers). The function F' used in this final integration may differ from the integration function F used during training.

It is preferable that the final integration function F' does not assign discriminative weights to each argument. It is preferable for the final integration function F' to exhibit less discrimination among individual arguments, even if applying discriminative weights to each argument, compared to the aforementioned integration function F. In this case, it is preferable to assign higher weights to those that conclude learning earlier and lower weights to those that conclude learning later.

As seen in this embodiment, the final learning parameter p_last is preferably derived (integrated) in the first distributed server 41 where batch learning ends the earliest. That is, a value of 'l' is greater than the values of 'm' and 'n'. Once batch learning in the first framework unit 51 ends (all epochs are finished), batch learning in the second and third framework units 52 and 53 may terminate independently of the remaining iterations. In this case compared to synchronous learning methods in the same environment, time may be further reduced.

Another embodiment of the asynchronous learning method is described with reference to FIG. 17. FIG. 16 illustrates an embodiment according to the learning cycle-based sharing policy mentioned above, where the latest learning parameter is spread to other framework units after a predetermined number of batch leanings. The integration policy in this embodiment is an example where learning parameters are used as arguments only when all the learning parameters are the most recent. The following description also refers to FIG. 15.

Each of the first to third framework units 51 to 53 may obtain each batch data (mini-batches b1 to b10) until the end of learning, and repeat batch learning (batch TR).

The first framework unit 51 may perform 1.1 batch learning on the model architecture to which 1.1 parameter p1.1 is assigned. Upon completing the 1.1 batch learning, the first framework unit 51 may derive learned 1.1' parameter p1.1'. The derived 1.1' parameter p1.1' may be directly used for 1.2 batch learning. Thus, the integration unit 320 of the first framework unit 51 may not need to execute the integration function F. The 1.2 parameter p1.2 has the same value as the 1.1' parameter p1.1'.

In this way, each distributed server DS1 to DS3 may independently perform batch learning until the learning parameters are spread.

Each of the framework units 51 to 53 may spread the latest learning parameter at a specific cycle of a number of times of batch learning. (S830). When batch learning indicated by bold lines in the diagram is completed, the most recent learning parameter may be spread.

In this embodiment, it is assumed that after the completion of two cycles of batch learning, a learning parameter is spread. The first framework unit 51, the second framework unit 52, and the third framework unit 53 may respectively spread a 1.2' learning parameter p1.2, a 2.2' learning parameter p2.2, and a 3.2 learning parameter p2.3 to the other distributed servers.

After spreading the learning parameters, each framework unit may integrate the learning parameters when all the latest learning parameters are received from other distributed servers.

For example, the first framework unit 51 may calculate a 1.4 parameter p1.4 by focusing on a 1.3' parameter p1.3' derived after the completion of 1.3 batch learning and integrating it with the 2.2' and 3.2' parameters spread respectively from the second and third distributed servers 42 and 43. The first framework unit 51 does not execute the integration function F after the 1.2 batch learning because it does not receive any other learning parameters following the 1.2 batch learning. The first framework unit 51 does not execute the integration function F after the 1.3 batch learning because it holds only one other recent learning parameter following the 1.3 batch learning.

After the completion of the 2.3 batch learning, the second framework unit 52 may derive a 2.4 parameter p2.4 by focusing on the 2.3' parameter p2.3' derived after the completion of 2.3 batch learning and integrating it with the 3.2' and 1.2' parameters spread respectively from the third and first distributed servers 43 and 41. The third framework unit 53 may calculate a 3.3 parameter p3.3 by focusing on a 3.2' parameter p3.2' derived after the completion of 3.2 batch learning and integrating it with the 1.2' and 2.2' parameters spread respectively from the first and second distributed servers 41 and 42.

The final trained learning parameter p_last may be calculated by the integration unit 320 of the first framework unit 51. The integration unit 320 of the first framework unit 51 may calculate the trained learning parameter p_last by performing integration F' based on 1.l', 2.m', and 3.n' learning parameters p1.l', p2.m', and p3.n' (where l, m, n are natural numbers). The function F' used in this final integration may differ from the integration function F used during training.

It is preferable that the final integration function F' does not assign discriminative weights to each argument. It is preferable for the final integration function F' to exhibit less discrimination among individual arguments, even if applying discriminative weights to each argument, compared to the aforementioned integration function F. In this case, it is preferable to assign higher weights to those that conclude learning earlier and lower weights to those that conclude learning later.

As seen in this embodiment, the final learning parameter p_last is preferably derived (integrated) in the first distributed server 41 where batch learning ends the earliest. That is, a value of 'l' is greater than the values of 'm' and 'n'. Once batch learning in the first framework unit 51 ends (all epochs are finished), batch learning in the second and third framework units 52 and 53 may terminate independently of the remaining iterations. In this case, time may be further reduced compared to a synchronous learning method under the same conditions.

An embodiment of the synchronous learning method is described with reference to FIG. 18. FIG. 15 illustrates an embodiment according to the "immediate sharing policy" mentioned above, where as soon as each batch learning ends in a certain framework unit, its latest learning parameter is spread to the other framework units. The integration policy in this embodiment is an example where learning parameters are used as arguments only when all the learning parameters are the most recent. The following description also refers to FIG. 15.

Each of the first to third framework units 51 to 53 may perform batch learning (batch TR) for each mini-batch b1 to b10 until the training ends.

The first framework unit 51 may perform 1.1 batch learning on the model architecture to which 1.1 parameter p1.1 is assigned. Upon completing the 1.1 batch learning, the first framework unit 51 may derive learned 1.1' parameter p1.1'.

The first framework unit 51 may spread the learned 1.1' parameter p1.1' to the second and third distributed servers 42 and 43 (S840).

The first framework unit 51 may determine whether the learning parameters (the other learning parameters) derived after the same-stage batch learning (1.1 batch learning) in the other distributed servers 42 and 43 have been updated in the first distributed server 41.

Once all the other learning parameters are updated in the first distributed server 41, the integration unit 320 of the first framework unit 51 may integrate all the learning parameters p1.1', p2.1', and p3.1' derived after the 1.1 batch learning using an appropriate integration function F to produce an integrated learning parameter p1.2 for use in the next batch learning.

The integration function F preferably focuses on the learning parameter derived from the corresponding framework unit, while integrating the remaining other parameters as secondary components. For example, the integration unit 320 of the first framework unit 51 may multiply a high weight to the 1.1' parameter p1.1' and a low weight to the remaining parameters p2.1' and p3.1' to derive the 1.2 parameter p1.2. Here, the sum of weights is preferably equal to 1. The weights may vary in size depending on factors such as the progress of learning or other elements.

The first framework unit 51 may update the integrated learning parameter p1.2 as a learning parameter to be applied in the next batch learning, and perform the next batch learning.

The integration units 320 of the respective framework units 52 and 53 in the second and third distributed servers 42 and 43 may respectively integrate 2.2 and 3.2 parameters p2.1 and p3.1 using all the learning parameters p1.1' p2.1' and p3.1' derived after the 1.1 batch learning, updating them as a learning parameter to be applied in the next batch learning, and perform the next batch learning.

Through these processes, the first to third framework units 51 to 53 may conduct testing until all epochs are completed.

Once all epochs are completed, the integration unit 320 of one of the plurality of distributed servers 41 to 43 or the integration unit 320 of the main server 40 may integrate the respective last learning parameters p1.n', p2.n', and p3.n' to derive the final learning parameter (p_last) (n is a natural number). The final integration function F' may differ from the integration function F used during learning. It is preferable that the final integration function F' does not assign discriminative weights to each argument.

While this synchronous learning method may require more time for learning compared to the asynchronous methods, it allows for a balanced use of each learning parameter.

Another embodiment of the synchronous learning method is described with reference to FIG. 19. FIG. 19 illustrates an embodiment according to any one of the time period-based sharing policy, learning cycle-based sharing policy, and other rule-based policy mentioned above. The integration policy in this embodiment is an example where learning parameters are used as arguments only when all the learning parameters are the most recent. The following description also refers to FIGS. 15, 16, and 18.

Each of the first to third framework units 51 to 53 may repeat batch learning (batch TR) for each mini-batch b1 to b10 until the learning ends.

The first framework unit 51 may perform 1.1 batch learning on the model architecture to which 1.1 parameter p1.1 is assigned. Upon completing the 1.1 batch learning, the first framework unit 51 may derive learned 1.1' parameter p1.1'. The derived 1.1' parameter p1.1' may be directly used for 1.2 batch learning. Thus, the integration unit 320 of the first framework unit 51 may not need to execute the integration function F. The 1.2 parameter p1.2 has the same value as the 1.1' parameter p1.1'. In this way, each distributed server DS1 to DS3 may independently perform batch learning until the learning parameters are spread. In this case, the start of each batch learning may not be necessarily synchronized.

Every framework unit 51 to 53 may spread the latest learning parameter at a specific time interval, learning cycle, or designated time (S820). In this embodiment, the framework units 51 to 53 may respectively spread 1.3', 2.3', and 3.3' learning parameters p1.3', p2.3', and p3.3' derived after the completion of the third batch learning to the other distributed servers.

After the spread of learning parameters, each framework unit may respectively integrate the learning parameters before the next batch learning, updating them to become p1.4, p2.4, and p3.4 learning parameters p1.4, p2.4, and p3.4. Subsequently, each framework unit 51 to 53 may proceed with batch learning until the next learning parameter is spread.

Referring to FIG. 13, among the plurality of distributed servers 41 to 43, any one, for example, the first distributed server 41, may convert the trained model architecture and trained learning parameter (p_last) into an architecture table and a learning parameter table, storing them in the trained learning model table (inference model table (Ti)) (S670). The stored data may be transmitted to or synchronized with the main server 40.

Distributed deep learning inference is described with reference to FIG. 14. The following description also refers to FIGS. 10 and 11. However, it should be noted that the environment of the main server 40 and the plurality of distributed servers 41 to 43 in a deep learning inference system may differ from that of the distributed deep learning training system. Each of the main server 40 and the plurality of distributed servers 41 to 43 may or may not include an integration unit 320 and 320-N. The main server 40 and the plurality of distributed servers 41 to 43 may be compatible with each other.

Referring to FIG. 14, a deep learning inference query with the same function as a learning query may be received from the terminal 20 (S710). In this example, assuming that the main server 40 is the same as the first distributed server 41 capable of deep learning, the main server 40 may receive the deep learning inference query. Hereinafter, it is assumed that deep learning inference is performed on the main server 40.

The main server 40 may include an inference dataset table in the storage unit 200. The main server 40 may receive data of an inference dataset through a query or from other devices.

The main server 40 may analyze the received deep learning inference query with the same function as a learning query and select an appropriate inference model table Ti (S715). The inference model table Ti may be described in the content of the deep learning inference query.

The main framework unit 50 of the main server 40 may construct an architecture table for the inference model table Ti into an inference model architecture suitable for the main framework unit 50 and assign learning parameters to the inference model architecture to generate a learning model for inference (S720).

The main server 40 may determine whether distributed inference is necessary (S725).

Distributed inference may refer to the execution of some of multiple tasks involved in performing deep learning on another device. The multiple tasks may be a sequence of processes for a single learning model or a set of tasks for multiple learning models. In the case of the former (single learning model), the multiple tasks need to be executed sequentially, and thus, after performing some tasks on one device, the remaining tasks may be executed on another device. In the case of the latter (multiple learning models), tasks belonging to each task group for a different learning model may be performed on a different device. In this case, tasks belonging to the task group of a higher-level learning model may be executed before those of a lower-level learning model. The latter may encompass the concept of distribution suggested by the former. In this embodiment, the description is based on the former, but it is apparent that the concept of the latter is included. Moreover, basically, tasks that are processed in a distributed manner must form a sequence of tasks. A sequence of tasks implies a chronological order, where tasks are directly connected to each other. For example, an output value of a task belonging to a sequence of tasks should be an input value for the subsequent task in another sequence of tasks.

An environment requiring distributed inference may vary.

As a first example of an environment requiring distributed inference, the execution time for a sequence of tasks on the first distributed server 41 is shorter than that on the main server 40. In this case, transmission of a distributed inference environment and time for transmitting the final result of the sequence of tasks may be considered. For this purpose, it is preferable for the main server 40 and the first distributed server 41 to be connected through a high-speed Wi-Fi or a high-speed mobile communication network such as 5G, 6G, etc. If the computing specifications of the main server 40 are low, such as in the case of mobile devices or embedded devices, and/or if the computing specifications of the first distributed server 41 are high, distributed inference may be necessary. Such an environment may be particularly suitable for an edge computing (mobile edge computing) environment. In an edge computing environment where the main server 40 is an edge device and the first distributed server 41 is an edge server, distributed inference may be preferable. Especially, in the case of an edge computing environment, the communication speed between an edge device and an edge server is very fast, making it suitable for this distributed inference.

As a second example of an environment requiring distributed inference, computing specifications may vary depending on the primary performance of each device, independent of their specifications. For example, if specific tasks are processed faster on the first distributed server 41 compared to the main server 40, it is preferable for those specific tasks to be distributed to and processed on the first distributed server 41.

As a third example of an environment requiring distributed inference, a set of tasks that can be processed separately among all the multiple tasks may be processed on different distributed servers. For instance, in the case of a learning model for classifying the gender and age of individuals, it may be separated into a gender classification learning model and an age classification learning model. Gender classification may be processed on the first distributed server 41, while age classification may be processed on the second distributed server 42, thereby reducing the overall execution time for deep learning.

As a fourth example of an environment requiring distributed inference, when there is a large amount of input data, the input data may be divided and distributed for processing. This example can be used in combination with other examples. For example, if there is a preprocessing process that converts input data into simpler tasks, the main server 40 may perform the preprocessing, and then transmit data requiring post-processing to another distributed server. This example may be particularly useful in cases where the communication environment is not fast, as only data requiring post-processing for deep learning needs to be sent to the distributed server.

When it is determined that distributed inference is necessary, the main server 40 may transmit the inference model table Ti to at least one of the plurality of distributed servers 41 to 43 (S730).

The main server 40 may instruct the plurality of distributed servers 41 to 43 to generate a learning model for inference based on the inference model table Ti.

The main server 40 may determine a distributed inference environment that includes the range of tasks for distributed inference and the distributed servers for distributed inference (S735). Based on the determined distributed inference environment, the main server 40 may instruct the determined distributed servers for distributed processing (S740). Detailed descriptions regarding instructions for distributed processing will be provided further below.

In cases where distributed inference is not needed or where there is a need for the main server 40 to perform some tasks of deep learning inference, even when instructing distributed inference, the main server 40 may perform all or some of the tasks associated with deep learning inference (S750). The main server 40 may use the generated inference models to perform full or partial deep learning for the query function on the data from the inference dataset tables.

The main server 40 may acquire inference results based on completed deep learning inference from itself or other distributed servers, and store them (S760) or notify the user.

Referring to FIG. 20, when it is determined that distributed inference is necessary, the main server 40 may transmit the inference learning model table Ti to the first and second distributed servers 41 and 42 (S730).

The first and second distributed servers 41 and 42 may generate a learning model for inference using the inference learning model table Ti according to instructions from the main server 40.

Referring to FIG. 21, the network structure (neural network) of the schematic learning model may include an input layer L_I, hidden layers L1 to L_N, and an output layer L_O.

The input layer may receive inputs from the inference dataset.

The hidden layer is where computations occur. The hidden layer L1 to L_N may be composed of one or multiple layers. The circles represent individual nodes, and each layer may be a set of nodes. The starting point of an arrow may represent an output of one node, and the endpoint may represent an input of another node.

The output layer may have as many output nodes as the number of values to be classified, serving as the result values of deep learning.

Deep learning execution may encompass multiple tasks. In other words, deep learning execution may proceed step by step through multiple tasks. Each of these multiple tasks may have a unique number to distinguish it from other tasks. Similarly, each of the multiple layers to be described below may have a unique number to distinguish it from other layers.

Multiple tasks may encompass all tasks for performing a query function without being dependent on a single learning model. The query's function may be categorized into multiple detailed functions, and deep learning inference may be performed using multiple learning models. In this case, multiple tasks may include both the first task group of the first learning model and the second task group of the second learning model.

Referring to FIG. 21 and FIG. 22, operations performed at nodes of a specific layer among the multiple layers of the learning model may correspond to one task.

For example, first output values R1 of layer 1 L1 may become second input values of layer 2 L2. The first output values R1 may be processed in layer 2 L2 and output as second output values R2. The process of transforming the second input values R1 to the second output values R2 may be referred to as "task 2 T2". The second output values may be referred to as a result value list 2 R2 of task 2 T2. A result value list may correspond to a task unique number and may have a unique number to distinguish it from other result value lists.

If there are N layers, there may be N tasks. The control unit 100, as shown on the right in FIG. 22, may store multiple result value lists R1 to R_N of multiple tasks T1 to T_N in an intermediate result value table T_R having a relational structure.

Referring to FIG. 23, the layers L_1 to L_N of the hidden layers may respectively correspond to rows H1 to H_N in a network table T_NW. Thus, a plurality of unique numbers of layers, a plurality of task unique numbers, and a plurality of row numbers may respectively correspond to one another. For example, layer 2 L2, task 2 T_2, and row number 2 H2 may correspond to one another.

The inference learning model table Ti may have a unique number to distinguish it from other learning model tables.

Referring to FIG. 20, the main server 40 may perform some tasks T1 to T5 on the main server 40 and distribute tasks T6 to T10 to be processed on the first distributed server 41. A second task may be task N T_N.

To this end, the main server 40 may perform some tasks T1 to T5 (S810) and transmit the unique number M_ID of the inference learning model table Ti, a result value list R5 of a third task T5, which is the task immediately preceding a first task T6, and a second row number H10 of the network table T_NW that corresponds to a unique number T10 of a second task to the first distributed server 41 (S812).

A query requested by a user may be analyzed into a higher-level primary detailed function and a lower-level secondary detailed function. For example, if the requested query is gender classification of individuals, it may be analyzed into a higher-level function of person detection in input data and a lower-level function of gender classification for the detected person. In this case, deep learning inference for the person detection function may be performed on the main server 40, and deep learning inference for the gender classification function of the detected person may be performed on the first distributed server 41.

As another example, the main server 40 may perform deep learning for preprocessing detection on inference data, and allow deep learning for the query function to be performed on the first distributed server 41 only when deep learning for the main function is required for the inference data. The preprocessing detection function may be a function to determine whether deep learning for the main function, which is the function of the query requested by the user, is necessary. For example, when the query is gender classification of individuals, the preprocessing detection function may be a function to detect the presence of a person in an input image. Images containing no persons do not require deep learning for the requested query, making it possible to reduce time and use less communication bandwidth.

Upon receiving the unique number M_ID of the inference model table Ti and the third result value list R5 from the main server 40, the first distributed server 41 may determine the third result value list R5 as a result value list R5 produced by a sequence of an initial task T1 to the fourth task T5 among the multiple tasks.

Among the plurality of network tables, a sixth row number H6 is positioned immediately after a third row number H5.

Upon further receiving the second row number H10 of the task instruction completion row in the network table T_NW, the first distributed server 41 may use the third result value list R5 as input in the first framework unit 51 of the first distributed server 41, and may perform operations associated with a sixth row number H6 to a second row number H10 in the network table T_NW (S814). That is, the first distributed server 41 may process the first to second tasks T6 to T10 of the previously generated inference learning model Ti in a distributed manner.

Once operations associated with the sixth row number H6 to the second row number H10 in the network table T_NW are completed, the first distributed server 41 may transmit the second result value list R2 to the main server 40 (S816-1). In this embodiment, this procedure may be executed when the second task T10 is the final task or when the main server 40 needs to perform other tasks.

In another embodiment, when the first distributed server 41 transmits the network table unique number M_ID, the second result value list R10 of the second task 10, and a seventh row number H_N of the task instruction completion row to the second distributed server 42, the first distributed server 41 may perform operations associated with the sixth row number H6 to the second row number H10 (S814) and then execute the instruction from the main server 40 (S816-2). The query analysis unit 110 of the main server 40 may analyze and/or extract the user's requested query into three levels of detailed functions.

For example, when the query is a function of classifying a gender of a person, the query analysis unit 110 may extract the requested query into a higher-level function of person presence detection, the next-level function of person detection, and a lower-level function of classifying the gender of the detected person. Whether a person exists in an image file, which is input data, may be determined through deep learning inference in the main server 40. The person detection function on the image file containing persons may be performed through deep learning inference in the first distributed server 41, and the gender classification function for the detected image may be performed through deep learning inference in the second distributed server 42. By doing so, the processing load on each server may be reduced, leading to reduced time, and since only images with persons are processed on the distributed servers, the processing time may be further reduced.

When the second distributed server 42 receives the unique number M_ID of the inference learning model table Ti, the second result value list R10, and the seventh row number H_N of the network table T_NW, it may perform operations related to row numbers 11 to N H_11 to H_N in the network table T_NW using the second result value list R10 and input (S818). In other words, the second distributed server 42 may process tasks 11 to N T_11 to T_N of the pre-generated inference learning model table Ti in a distributed manner.

The second distributed server 42 may determine a seventh result value list R_N as a result of the distribution processing (S818) and transmit it to the main server 40 (S820).

The present invention may be implemented in hardware or in software. The invention may also be implemented as computer-readable code on a computer-readable recording medium. That is, the present invention may be implemented in the form of a recording medium including computer executable instructions. A computer-readable medium may be any usable medium that stores data that can be accessed and read by a computer system. Examples of the computer-readable medium may include a computer storage medium and a communication storage medium. The computer storage medium includes all volatile and nonvolatile media and detachable and non-detachable media implemented by a certain method or technology for storing information such as computer-readable instructions, data structures, program modules, or other data. The communication storage medium typically includes a modulated data signal such as a carrier wave, or other transmission mechanisms, and includes information transmission media. Also, functional programs, codes, and code segments for accomplishing the present invention can be easily construed by programmers skilled in the art to which the present invention pertains.

Although preferred embodiments of the present invention have been described using specific terms, the specification and drawings are to be regarded in an illustrative rather than a restrictive sense in order to help understand the present disclosure, it is obvious to those skilled in the art that various modifications and changes can be made thereto without departing from the broader spirit and scope of the disclosure and such modifications and changes should not be understood individually from the technical spirit or prospect of the disclosure.

REFERENCE NUMERALS

10: DB server 20: terminal
40: main server 41: first distributed server
42: second distributed server 43: third distributed server
51: first framework unit 52: second framework unit
53: third framework unit 100: control unit
110: Query analysis unit 120: dataset management module
130: learning model management module 160: result management module
170: auxiliary management module 200: storage unit
300: framework unit 310: QML module
320: integration unit 360: converter unit

The invention claimed is:

1. A deep learning framework application database server comprising:
    an input/output unit configured to receive an inference query from a user;
    a storage unit serving as a database and comprising a previously learned first learning model table and an inference dataset table associated with the inference query; and
    a framework unit configured to interwork with the database and perform deep learning for the inference query using the first learning model table and the inference dataset table,
    wherein a first learning model linked to the first learning model table comprises multiple tasks, the multiple tasks correspond to a plurality of rows in a network table included in the first learning model table, each of the multiple tasks has a unique number respectively corresponding to row numbers in the network table, the deep learning framework application database server further comprises a control unit configured to control a first distributed server among a plurality of distributed servers to execute a sequence of first to second tasks among the multiple tasks, enabling distributed deep learning inference, each server of the plurality of distributed servers comprises a deep learning framework that interworks with the database and comprises the first learning model table,
    wherein a learning model management module is configured to select a second learning model table suitable for a function of the inference query in an absence of the first learning model table,
    the second learning model table is converted into the first learning model table through deep learning training for a first detailed function based on an associated training dataset table, and
    the deep learning training is performed on the plurality of distributed servers in a distributed manner, wherein the control unit is configured to spread a batch size of a training dataset, the second learning model table, and the training dataset table to the plurality of distributed servers, the deep learning framework application database server is configured to function as a first distributed server among the plurality of distributed servers, the control unit is configured to randomly change a data order in the training dataset table, then divide data to the batch size, and convert divided data into a batch dataset table, the framework unit is configured to construct a model architecture using an architecture table belonging to the second learning model table, initialize a learning parameter table belonging to the second learning model table and then assign the initialized learning parameter table to the model architecture to generate a second learning model, and perform deep learning training on the second learning model by using multiple mini-batches in the batch dataset table, the framework unit is configured to derive a new learning parameter when batch learning on one mini-batch among the multiple mini-batches ends, the control unit is configured to spread the new learning parameter to remaining other distributed servers of the plurality of distributed servers, the control unit is configured to spread the learning parameters derived from the framework unit to other framework units, based on one of policies, such as an immediate sharing policy where as soon as each batch learning ends in a certain framework unit, its latest learning parameter is spread to the other framework units, a time period-based sharing policy where the latest learning parameter is spread to other framework units after a predetermined time period, and a learning cycle-based sharing policy where the latest learning parameter is spread after a predetermined number of batch learnings.

2. The deep learning framework application database server of claim 1, wherein the control unit is configured to transmit a unique number of the first learning model table, a third result value list of a third task immediately preceding the first task, and a second row number in the network table that corresponds to a unique number of the second task to the first distributed server.

3. The deep learning framework application database server of claim 1, wherein the control unit is configured to, when receiving a unique number of the first learning model table and a fourth result value list of a fourth task among the multiple tasks from a second distributed server among the plurality of distributed servers, determine the fourth result value list as a result value list resulting from execution of a sequence of initial to fourth tasks among the multiple tasks.

4. The deep learning framework application database server of claim 3, wherein a fifth row number is positioned immediately after a fourth row number in a plurality of network tables and the control unit is configured to, when further receiving a sixth row number that is a task instruction completion row from the second distributed server, control the framework unit to perform operations for the fifth row number to the sixth row number by using the fourth result value list as an input.

5. The deep learning framework application database server of claim 2, wherein the control unit is configured to control the first distributed server to transmit the unique number of the network table, a result value list of the second task, and a seventh row number that is a task instruction completion row to a third distributed server among the plurality of distributed servers.

6. The deep learning framework application database server of claim 1, wherein execution time for the first to second tasks on the framework unit is greater than a sum of communication time with the first distributed server and execution time for the first to second tasks on the first distributed server.

7. The deep learning framework application database server of claim 1, further comprising: a query analysis unit configured to analyze the inference query to extract a query of the inference query, wherein the query analysis unit is configured to further extract a preprocessing detection function for detecting whether deep learning inference on inference data for the function of the query which is a primary function is needed, the storage unit comprises a plurality of learning model tables associated with the function of the query and the preprocessing detection function, and the control unit is configured to allow deep learning inference for the preprocessing detection function to be performed on first inference data of the inference dataset table, and control the first to second tasks for the first inference data to be executed on the first distributed server when the first inference data is classified as requiring the deep learning inference for a main function.

8. The deep learning framework application database server of claim 1, further comprising: an integration unit configured to integrate the new learning parameter, when generated, and at least one learning parameter spread from the remaining other distributed server, updating the integrated parameter as a learning parameter to be applied to next batch learning, wherein the integration unit is configured to derive a final learning parameter by integrating a last learning parameter derived by the framework unit and at least one latest learning parameter spread from the remaining other distributed servers when all assigned epochs are finished, and the control unit is configured to convert a trained model architecture and the final learning parameter into the learned first learning model table.

\* \* \* \* \*